(12) United States Patent
Elazzouni et al.

(10) Patent No.: US 11,641,630 B2
(45) Date of Patent: May 2, 2023

(54) TIME-SENSITIVE NETWORKING SUPPORT OVER SIDELINK

(71) Applicant: QUALCOMM Incorporated, San Diego, CA (US)

(72) Inventors: Sherif Elazzouni, San Diego, CA (US); Ozcan Ozturk, San Diego, CA (US); Rajat Prakash, San Diego, CA (US); Piyush Gupta, Bridgewater, NJ (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/323,981

(22) Filed: May 18, 2021

(65) Prior Publication Data

US 2022/0377684 A1  Nov. 24, 2022

(51) Int. Cl.
*H04W 56/00* (2009.01)
*H04J 3/06* (2006.01)
*H04W 92/18* (2009.01)

(52) U.S. Cl.
CPC ......... *H04W 56/001* (2013.01); *H04J 3/0685* (2013.01); *H04W 92/18* (2013.01)

(58) Field of Classification Search
CPC .... H04W 56/001; H04W 92/18; H04J 3/0685
See application file for complete search history.

(56) References Cited

U.S. PATENT DOCUMENTS

| | | | | |
|---|---|---|---|---|
| 2019/0190635 A1* | 6/2019 | Goel | ...................... | H04J 3/0644 |
| 2020/0084663 A1* | 3/2020 | Park | ...................... | H04W 76/27 |
| 2020/0107213 A1* | 4/2020 | Park | ...................... | H04W 8/06 |
| 2020/0120536 A1* | 4/2020 | Prakash | ................... | H04L 47/24 |
| 2020/0137615 A1* | 4/2020 | Joseph | ................... | H04W 24/02 |
| 2020/0169972 A1* | 5/2020 | Marce | ................... | H04L 47/283 |

(Continued)

FOREIGN PATENT DOCUMENTS

| | | | | | |
|---|---|---|---|---|---|
| CN | 105659673 A | * | 6/2016 | ............ | H04J 3/0661 |
| WO | WO-2016037178 A1 | * | 3/2016 | ............ | G06Q 40/04 |

(Continued)

OTHER PUBLICATIONS

English translation of WO-2021159508-A1, printout form Google Patents (Year: 2018).*

(Continued)

*Primary Examiner* — Chi H Pham
*Assistant Examiner* — Vladislav Y Agureyev
(74) *Attorney, Agent, or Firm* — Holland & Hart LLP

(57) ABSTRACT

Methods, systems, and devices for wireless communications are described. A first device node, such as an end station or a user equipment (UE) associated with the end station, may receive, from a controller node of a time-sensitive network (TSN), a configuration for communicating over the TSN. The TSN may include a plurality of nodes that are synchronized according to a common synchronization configuration and that are configured for transmitting messages between the controller node and the first device node within a latency threshold condition configured for the TSN. The first device node may identifying data to transmit to a second device node of the plurality of nodes and may communicating with the second device node via a sidelink connection associated with the wireless radio access network.

30 Claims, 21 Drawing Sheets

(56) References Cited

U.S. PATENT DOCUMENTS

| | | | |
|---|---|---|---|
| 2020/0259896 A1* | 8/2020 | Sachs | H04L 63/0823 |
| 2021/0014806 A1* | 1/2021 | Perez-Ramirez | G06F 1/12 |
| 2021/0258136 A1* | 8/2021 | Hoffleit | G06F 1/14 |
| 2021/0306910 A1* | 9/2021 | Guo | H04W 56/001 |
| 2022/0086218 A1* | 3/2022 | Sabella | H04L 67/141 |
| 2022/0263743 A1 | 8/2022 | Gebert et al. | |

FOREIGN PATENT DOCUMENTS

| | | |
|---|---|---|
| WO | WO-2021004191 A1 | 1/2021 |
| WO | WO-2021159508 A1 * | 8/2021 |

OTHER PUBLICATIONS

International Search Report and Written Opinion—PCT/US2022/029157—ISA/EPO—dated Aug. 25, 2022.

NTT Docomo, et al., "Discussion on uplink Time Synchronization for TSN", 3GPP TSG-RAN WG2 #112-e, R2-2010532, 3rd Generation Partnership Project, Mobile Competence Centre, 650, Route Des Lucioles, F-06921 Sophia-Antipolis Cedex, France, vol. RAN WG2, No. Electronic Meeting, Nov. 2, 2020-Nov. 13, 2020, 4 Pages, Oct. 23, 2020, XP051943194, the whole document.

\* cited by examiner

TIME-SENSITIVE NETWORKING SUPPORT OVER SIDELINK

FIELD OF TECHNOLOGY

The following relates to wireless communications, including time-sensitive networking support over sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as industrial networks, may include components that enable real-time communications including timing and synchronization, latency, reliability, and resource management. Such wireless communications systems may be referred to as time-sensitive networking (TSN) systems or networks and may include ethernet-based technology to support applications such as factory automation. A TSN system may include a number of nodes such as controller nodes, and device nodes (e.g., robotic arms, other robotic components or devices that may execute instructions from a controller or another device) which may be referred to as TSN end points or TSN end stations.

SUMMARY

The described techniques relate to improved methods, systems, devices, and apparatuses that support time-sensitive networking over sidelink. Generally, the described techniques provide for sidelink communications for time-sensitive networking (TSN) systems supporting time-sensitive communications (TSC). For example, some TSN systems may implement communications between device nodes of the TSN system via sidelink communications and may include techniques for implementing sidelink communications in a TSN network, sidelink synchronization, and sidelink quality of service (QoS) management.

In some examples, a management component may be incorporated into a system such that sidelink communications may be integrated as part of a TSN bridge (e.g., a singular bridge from the perspective of the TSN network end points including the management component, TSN components, and sidelink components), where the different components, links, and functions of the sidelink may be implemented within the TSN bridge (e.g., indistinguishable from wireless multiple access network components by TSN network end points) where operations within the bridge are supervised by the additional management layer. Additionally or alternatively, in some examples TSN networks, the components, links, and functions of the sidelink may be individually exposed to the TSN end points as a separate link of the TSN system (e.g., as a point-to-point link or a point-to-point tunnel) and thus identifiable to the TSN end points as a separate sidelink connection.

Such systems may also employ several approaches for maintaining synchronization on sidelink. For example, a clock associated with wireless multiple access communications (e.g., a clock associated with 5G networks or the like) may be distributed (e.g., copied) to the device nodes of the TSN system. In such examples, synchronization may be performed based on a respective copy of the 5G clock following a number of protocols for sidelink synchronization. In some examples, the device nodes may be synchronized using a local device clock (e.g., as opposed to the 5G clock) that is passed or copied from device node to device node. For example, a first device node may pass a local clock to a second device node and a third device node to use when communicating with the first device node. In some examples, a portion of nodes in the TSN system may be synchronized based on the 5G clock and a portion of nodes may be synchronized based on the local device clock.

Such systems may also employ several approaches for passing sidelink bridge QoS information to TSN nodes. For example, a management layer of a sidelink bridge may calculate a sidelink QoS parameter which may include an indication of the latency and reliability of the sidelink. The management layer may combine the sidelink QoS parameter with a Uu interface QoS parameter measured between two UEs of the TSN system each associated with an end station to calculate aggregate TSN QoS parameters. The management layer may report the aggregate TSN QoS parameters to the device nodes. In some examples, where sidelink may be implemented as a point-to-point link, a component associated with a device node (e.g., such as a device-specific TSN translator) may derive QoS parameters on the sidelink and may report the QoS parameters as the point-to-point link QoS information to TSN device nodes of the system in addition to reporting any other applicable QoS parameters associated with the TSN.

A method is described. The method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node, identifying data to transmit from the first device node to a second device node of the set of multiple nodes, and communicating with the second device node via a sidelink connection associated with the wireless radio access network.

An apparatus is described. The apparatus may include a processor, memory coupled with the processor, and instructions stored in the memory. The instructions may be executable by the processor to cause the apparatus to receive, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node, identify data to transmit from the first device node to a second device node of the set of multiple nodes, and communicate with the second device node via a sidelink connection associated with the wireless radio access network.

Another apparatus is described. The apparatus may include means for receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node, means for identifying data to transmit from the first device node to a second device node of the set of multiple nodes, and means for communicating with the second device node via a sidelink connection associated with the wireless radio access network.

A non-transitory computer-readable medium storing code is described. The code may include instructions executable by a processor to receive, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node, identify data to transmit from the first device node to a second device node of the set of multiple nodes, and communicate with the second device node via a sidelink connection associated with the wireless radio access network.

In some examples of the method, apparatuses, and non-transitory computer-readable medium described herein, the sidelink connection may be configured as a link within the bridge associated with the wireless radio access network.

In some examples of the method, apparatuses, and non-transitory computer-readable medium described herein, communicating with the second device node via the sidelink connection may include operations, features, means, or instructions for transmitting the data to a management layer within the bridge associated with the wireless radio access network.

In some examples of the method, apparatuses, and non-transitory computer-readable medium described herein, the sidelink connection may be associated with a single user plane function identifier.

In some examples of the method, apparatuses, and non-transitory computer-readable medium described herein, the management layer may be configured to interface between one or more components of the sidelink connection and one or more components associated with the first device node.

In some examples of the method, apparatuses, and non-transitory computer-readable medium described herein, the sidelink connection may be configured as an exposed link of the time-sensitive network.

In some examples of the method, apparatuses, and non-transitory computer-readable medium described herein, the sidelink connection may be associated with a device-side time-sensitive network translator of the time-sensitive network and the device-side time-sensitive network translator may be exposed to the first device node.

In some examples of the method, apparatuses, and non-transitory computer-readable medium described herein, communicating with the second device node via the sidelink connection may include operations, features, means, or instructions for transmitting the data to the device-side time-sensitive network translator of the time-sensitive network.

In some examples of the method, apparatuses, and non-transitory computer-readable medium described herein, the wireless radio access network may be associated with a second dedicate time-sensitive network translator separate from the device-side time-sensitive network translator associated with the sidelink connection.

Some examples of the method, apparatuses, and non-transitory computer-readable medium described herein may further include operations, features, means, or instructions for determining a synchronization timing at the first device node based on a synchronization clock associated with the wireless radio access network.

Some examples of the method, apparatuses, and non-transitory computer-readable medium described herein may further include operations, features, means, or instructions for transmitting, to the second device node, a sidelink synchronization frame including an indication of the synchronization timing.

In some examples of the method, apparatuses, and non-transitory computer-readable medium described herein, a time-sensitive network translator may be configured to modify the indication of the synchronization timing based on the synchronization clock associated with the wireless radio access network.

Some examples of the method, apparatuses, and non-transitory computer-readable medium described herein may further include operations, features, means, or instructions for determining a synchronization timing at the first device node based on a local clock at the first device node that may be configured for sidelink communications.

Some examples of the method, apparatuses, and non-transitory computer-readable medium described herein may further include operations, features, means, or instructions for transmitting, to the second device node, a timestamped synchronization message and receiving a response to the timestamped synchronization message, where determining the synchronization timing may be based on receiving the response.

Some examples of the method, apparatuses, and non-transitory computer-readable medium described herein may further include operations, features, means, or instructions for transmitting the determined synchronization timing to a time-sensitive network translator associated with the second device node.

In some examples of the method, apparatuses, and non-transitory computer-readable medium described herein, the local clock at the first device node may be a copy of a synchronization clock associated with the wireless radio access network.

Some examples of the method, apparatuses, and non-transitory computer-readable medium described herein may further include operations, features, means, or instructions for determining the latency condition of the time-sensitive network based on a latency threshold associated with the wireless radio access network and transmitting the latency condition to a time-sensitive network translator associated with the second device node.

In some examples of the method, apparatuses, and non-transitory computer-readable medium described herein, determining the latency condition may include operations, features, means, or instructions for determining a latency threshold associated with sidelink communications based on a delay associated with sidelink communications and combining the latency threshold associated with the wireless radio access network with the latency threshold associated with sidelink communications.

In some examples of the method, apparatuses, and non-transitory computer-readable medium described herein, transmitting the latency condition may include operations, features, means, or instructions for transmitting the combination of the latency threshold associated with the wireless radio access network and the latency threshold associated with sidelink communications to the time-sensitive network translator.

Some examples of the method, apparatuses, and non-transitory computer-readable medium described herein may further include operations, features, means, or instructions for transmitting an indication of the latency condition of the time-sensitive network to an application function associated with the first device node.

Some examples of the method, apparatuses, and non-transitory computer-readable medium described herein may further include operations, features, means, or instructions for determining the latency condition of the time-sensitive network based on a quality of service metric associated with the first device node.

DETAILED DESCRIPTION

Figure 1:
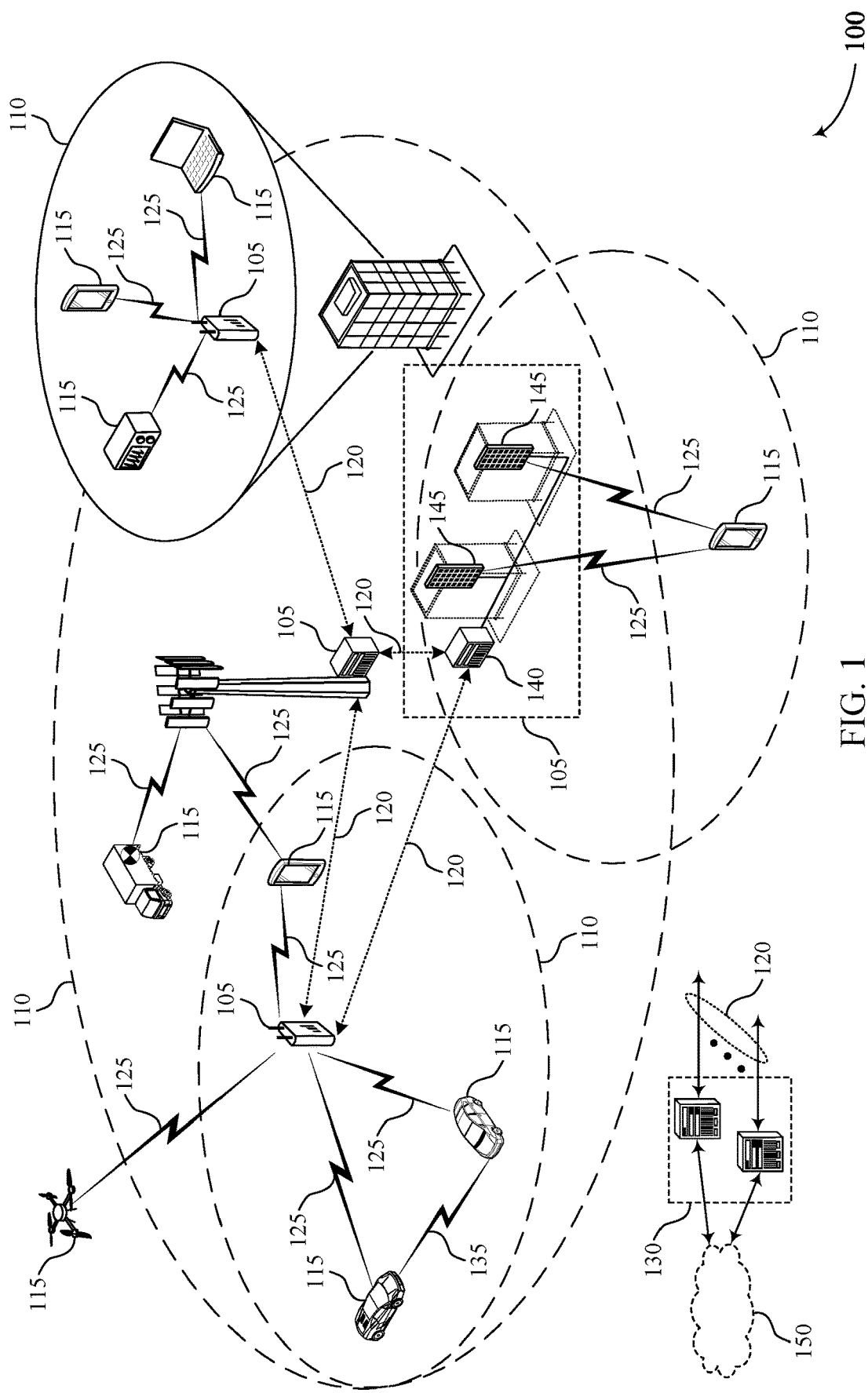
FIG. 1 illustrates an example of a wireless communications system that supports time-sensitive networking (TSN) support over sidelink in accordance with aspects of the present disclosure.

Some wireless communications systems (e.g., time sensitive networking (TSN) systems) may be used to facilitate communications in networks that rely on relatively strict timing synchronization of network components (e.g., time-sensitive communications (TSC)). Such systems may be used to support, for example, factory automation. Some TSN systems may specify relatively stringent quality of service (QoS) parameters, such as a latency condition, jitter, and reliability requirements for data traffic (e.g., less than 1 ms latency and $10^{-6}$ reliability). Some TSN systems may also include support for traffic shaping and path reservations. In some cases, such data traffic may be supported in a wireless communications system using a high reliability service, such as an ultra-reliable low latency communication (URLLC) service. TSN systems may include various networking nodes including device nodes, networking nodes, and bridges, among other examples. Device nodes may also be collectively referred to as end stations that are collocated with a dedicated UE that supports wireless multiple access communications.

In some examples, all or a portion of communications between TSN nodes may be transmitted via a wireless multiple access system. For example, device nodes may communicate via a communications bridge that includes multiple translators for translating TSN communications into wireless multiple access communications and vice versa. The communications bridge may also include a base station for relaying or forwarding communications packets, a set of network functions, and a working domain, among other various components. However, some TSN systems may implement communications between device nodes of the TSN via sidelink communications of the wireless multiple access system and may provide techniques for exposing sidelink communications to the integrated TSN system, as well as techniques for sidelink network synchronization, and sidelink QoS management in the context of the TSN communications system.

For example, there may be several approaches for exposing a sidelink to TSN end stations. In a first example, an additional management layer may be added to a wireless multiple access bridge (e.g., a 5GS bridge) that may route communications (e.g., TSN packets) between a first device node and a second device node through a sidelink of the 5GS bridge, or through a base station Uu path of the 5GS bridge. The sidelink may be indistinguishable from the 5GS bridge by the TSN device nodes in the system and may function as an internal mechanism of the 5GS bridge. In some examples, each 5GS bridge may be associated with a dedicated user-plane function (UPF) that may support features and capabilities for user plane operation, such as packet routing and forwarding, interconnection to a data network UPF, etc. Thus, each sidelink may be associated with the UPF through the management layer. For example, a network initiating the sidelink TSN connectivity can nominally bind the sidelink to an existing UPF ID and may determine which bridge contains the sidelink based on the UPF ID. This architecture or approach of implementing a wireless access system into a TSN network may be referred to as adaptation.

In a second example, the sidelink may be exposed as a standalone TSN component (e.g., aside from or in parallel to the bridge, which may for example be a 5GS bridge) visible to TSN device nodes. A dedicated translator may be allocated to the sidelink bridge to support communications routed through the sidelink bridge. For example, in this scenario, each TSN device node may observe a point-to-point link in the topology in addition to the 5GS bridge. This architecture of implementing a wireless access system into a TSN network may be referred to as integration.

Such systems may also employ several approaches for maintaining synchronization during sidelink communications. In a first approach, a system clock associated with the wireless multiple access system (e.g., a master clock, a 5GS clock, or the like) may be distributed to the translators of the TSN. The translators may determine time by applying protocols for synchronization based on their respective copy of the system clock. In a second approach, the translators may be synchronized using a local clock (e.g., a local clock at a UE of the TSN system). For example, a UE associated with a first end station may pass its local clock to UEs associated with a set of other end stations to use when communicating with the first device node.

Such systems may also employ several approaches for passing bridge QoS information to TSN nodes. In a first example, the management layer of the 5GS bridge may calculate a sidelink PC5 QoS indicator (PQI) that may include information relating to the latency and reliability of the sidelink and may combine the sidelink PQI with a 5G QoS Indicator (5QI) associated with the Uu link of the 5GS bridge. The management layer may calculate an aggregate bridge QoS indicator (e.g., a latency threshold associated with a maximum bridge delay) and may transmit the aggregate bridge QoS indicator to the associated device nodes (e.g., without exposing or indicating an individual link's QoS indicator). In such examples, the device node may receive the aggregate bridge QoS indicator but may be unable to discern the portion of the aggregate bridge QoS indicator attributed to PQI from the portion of the aggregate bridge QoS indicator attributed to the 5QI.

In a second example, the sidelink may be implemented as a sidelink bridge component between TSN device nodes and thus may include a dedicated translator. The sidelink translator may derive a PQI QoS on the sidelink, and may report the PQI QoS as the link QoS information to TSN device nodes.

Aspects of the disclosure are initially described in the context of wireless communications systems. Aspects of the disclosure are then described in the context of TSN bridge configurations, timing synchronizations, scaled timing synchronizations, and wireless communications systems. Aspects of the disclosure are further illustrated by and described with reference to apparatus diagrams, system diagrams, and flowcharts that relate to TSN support over sidelink.

FIG. 1 illustrates an example of a wireless communications system 100 that supports TSN support over sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lowerpowered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some aspects of the present disclosure, one or more UEs 115 or other network devices may be coupled with one or more TSN endpoints and may collectively be referred to as device nodes. Sidelink implementation, timing synchronization, and QoS reporting among one or more TSN endpoints or device nodes in communication with each other via wireless communications system 100 may be provided by a portion of the wireless communications system 100 that carries TSN data (e.g., a TSN system). A first TSN endpoint associated with a UE 115 may receive, from a controller node associated with a base station 105 of the portion of wireless communications system 100 that carries TSN data, a configuration for communicating over the TSN system. The TSN system may include a plurality of device nodes, each associated with a respective UE 115, that are synchronized according to a common synchronization configuration and that are configured for transmitting messages between the controller node associated with the base station 105 and the first TSN endpoint within a latency condition configured for the TSN system. In some examples, the TSN system may include a wireless radio access network configured as a bridge between the first TSN endpoint associated with the UE 115 and a second TSN endpoint associated with a second UE 115 where the controller node associated with the base station 105 is integrated with the bridge. In some examples, the controller node associated with the base station 105 may be in communications with the second TSN end point and may relay or forward communications between the first TSN end point and the second TSN endpoint.

In some examples, the first TSN endpoint may communicate with the second TSN endpoint via a sidelink connection associated with the wireless radio access network. For example, the sidelink connection may be implemented within the bridge or may act as a second bridge between the TSN endpoints.

Figure 2:
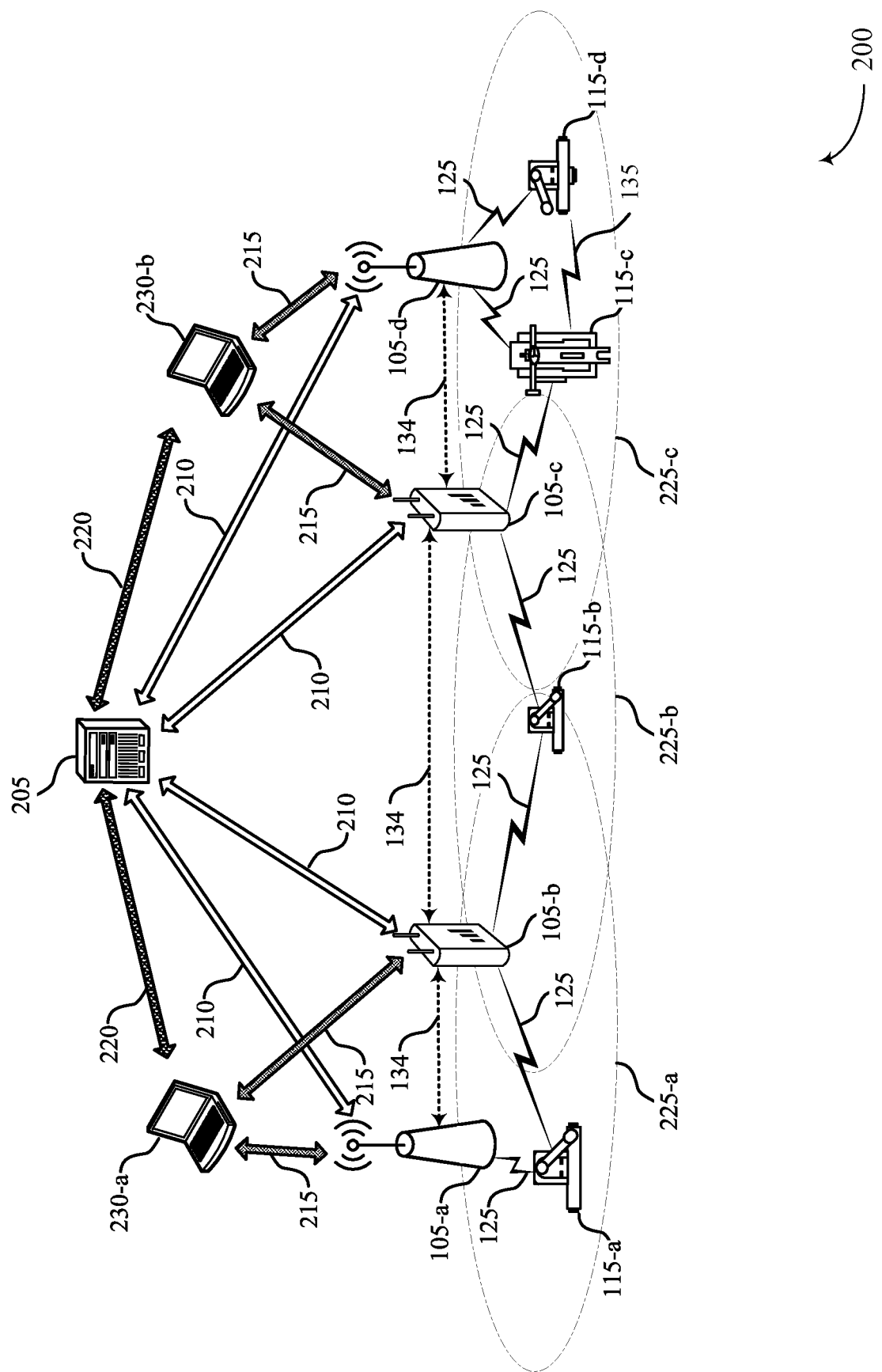
FIG. 2 illustrates an example of a wireless communications system that supports TSN support over sidelink in accordance with aspects of the present disclosure.

FIG. 2 illustrates an example of a wireless communications systems 200 that supports TSN support over sidelink in accordance with aspects of the present disclosure. In some examples, wireless communications system 200 may implement aspects of wireless communications system 100. In wireless communications system 200, a network function 205 (e.g., a grandmaster TSN function, a multicell/multicast coordination entity (MCE), a node within the core network 130, a TSN adaptation function, among other examples) may facilitate the sidelink communications between two or more devices within the wireless communications system 200. In some cases, the two or more devices may comprise TSN end points (e.g., device nodes). In some cases, the wireless communications system 200 may be located in an industrial setting, and each of the UEs 115 or device nodes 115 may be associated with a piece of equipment that may be a TSN endpoint within the industrial setting, although techniques provided herein may be used in any on a number of other deployment scenarios. A device node may be referred to when discussing a TSN endpoint and its associated UE 115. In some cases, a number of different network functions 205 may be provided on a number of different nodes within the wireless communications system 200.

In the example of FIG. 2, a number of coverage areas 225 may each include multiple base stations 105 capable of communicating via communication links 125 with one or more device nodes 115 within the coverage area 225. The base stations 105 may be any one of a base station, an eNB, a gNB, an IoT gateway, a cell, etc. The base stations 105 may communicate with a management system (e.g., a network function 205) via links 210. The management system may include, for example, components which may provide controller programming for TSN endpoints that may be associated with different device nodes, software and security management of the wireless communications system 200, long term key performance indicator (KPI) monitoring, among other functions. In some cases, the management system may include one or more clocks that are used for synchronizing one or more network nodes or TSN endpoints.

In the example of FIG. 2, the base stations 105 may also communicate with human-machine-interfaces (HMIs) 230 via communication links 215 and HMIs 230 may communicate with network function 205 (or other management system) via links 220. HMIs 230 may include, for example, tablet computers, control panels, wearable devices, control computers, and the like, which may provide control for different equipment within the system (e.g., start/stop control, mode change control, augmented or virtual reality control, etc., for a piece of equipment that may include a device node 115 (e.g., including a TSN endpoint and a UE).

In some cases, one or more programmable logic controllers (PLCs) may be associated with one or more base stations 105 and may issue a series of commands (e.g., motion commands for a piece of equipment), receive sensor inputs (e.g., position of a robotic arm of a piece of equipment), and coordinate with other PLCs. In such cases, the wireless communications between the base stations 105, device nodes 115, HMIs 230, network function 205, and/or one or more other network functions or nodes may provide near real-time information as part of a TSN.

A bridge (which may for example, be referred to as a 5GS bridge or a TSN bridge) may include ports on a single UPF side (e.g., the base station side), the user plane tunnel between the UE and UPF, and the ports on the DS-TT side (e.g., the UE side). Each node of the TSN may be associated with a respective translator. For example, each end station of the TSN system may have a Device-Side TSN Translator (DS-TT) and each network node (e.g., base station) may have a Network-Side TSN Translator (NW-TT). For each bridge of a TSN network, the ports associated with NW-TT may support the connectivity to the TSN network, where the ports on DS-TT side may be associated to a packet data unit (PDU) session providing connectivity to the TSN network. The granularity of the logical TSN bridge is per UPF, meaning the bridge ID of the logical TSN bridge is bound to the UPF ID of the UPF associated with the base station 105. A TSN application function may store the binding relationship between a port on UE/DS-TT side, a port on UPF/NW-TT side, and a PDU Session during reporting of logical TSN bridge information. For example, there may be one PDU Session per DS-TT port for a given UPF. All PDU Sessions which connect to the same TSN network via a specific UPF may be grouped into a single virtual bridge. The capabilities of each port on the UE/DS-TT side and UPF/NW-TT side are integrated as part of the configuration of the 5G virtual bridge and are reported to the TSN AF and delivered to a core network controller for TSN bridge registration and modification.

In order to schedule TSN traffic over the bridge, the configuration information of the bridge may be mapped to 5GS QoS within a corresponding PDU Session. For example, the information obtained from TSN network may be mapped into 5GS QoS information (e.g., 5QI, TSC Assistance Information) of a QoS flow in corresponding PDU Session for efficient time-aware scheduling. The session management function may report the media access control (MAC) address of the DS-TT port of the related PDU Session to the AF via a policy control function as the MAC address of the PDU Session. The association between the MAC address used by the PDU session, bridge ID and port number on DS-TT is maintained at the AF and may be further used to bind the TSN traffic with the UE's PDU session.

There may be two broad architecture options for wireless multiple access communications within a TSN system. For example, a wireless multiple access network, may be implemented by the TSN system as a singular bridge (e.g., implementing all of most of the aspects associated with the wireless multiple access network between nodes of the TSN system), where the different components, links, and functions of the wireless multiple access network may be implemented within the TSN bridge to communicate TSN data between TSN nodes. Additionally or alternatively, in some examples TSN systems, the components, links, and functions of the wireless multiple access system may be individually exposed to the TSN end points as separate links (e.g., a point-to-point link or a point-to-point tunnel) to communicate TSN data between nodes of the TSN system. In such examples, the point-to-point links may be individually identifiable to the TSN end points. In some cases, wireless communications system 200 may provide for sidelink communications, sidelink synchronization, and sidelink QoS management among a set of TSN endpoints.

In some cases, sidelink communications via communication link 135-a may be transmitted via the wireless communications system 200. Such sidelink communication links may be implemented alongside or integrated with a TSN bridge that supports wireless multiple access communications, such as 5G, between device nodes 115.

In some examples, a sidelink may be implemented as an independent bridge in conjunction with the TSN bridge supporting wireless multiple access communications. In some examples, a sidelink data flow may be established via the wireless communications system 200 in which one or more system messages associated with the data flow may provide timing information for the data flow. Such a data flow may include or be associated with, for example, one or more QoS flows, one or more protocol data units (PDUs), one or more radio bearers, one or more radio link control (RLC) channels, one or more logical channels, one or more transport channels, or any combinations thereof. Additionally, the one or more system messages may include one or more network access stratum (NAS) messages, one or more access stratum (AS) messages, one or more messages exchanged between two network functions in the wireless communications system 200, one or more messages exchanged between two entities in the wireless communications system 200, or any combinations thereof.

Figure 3:
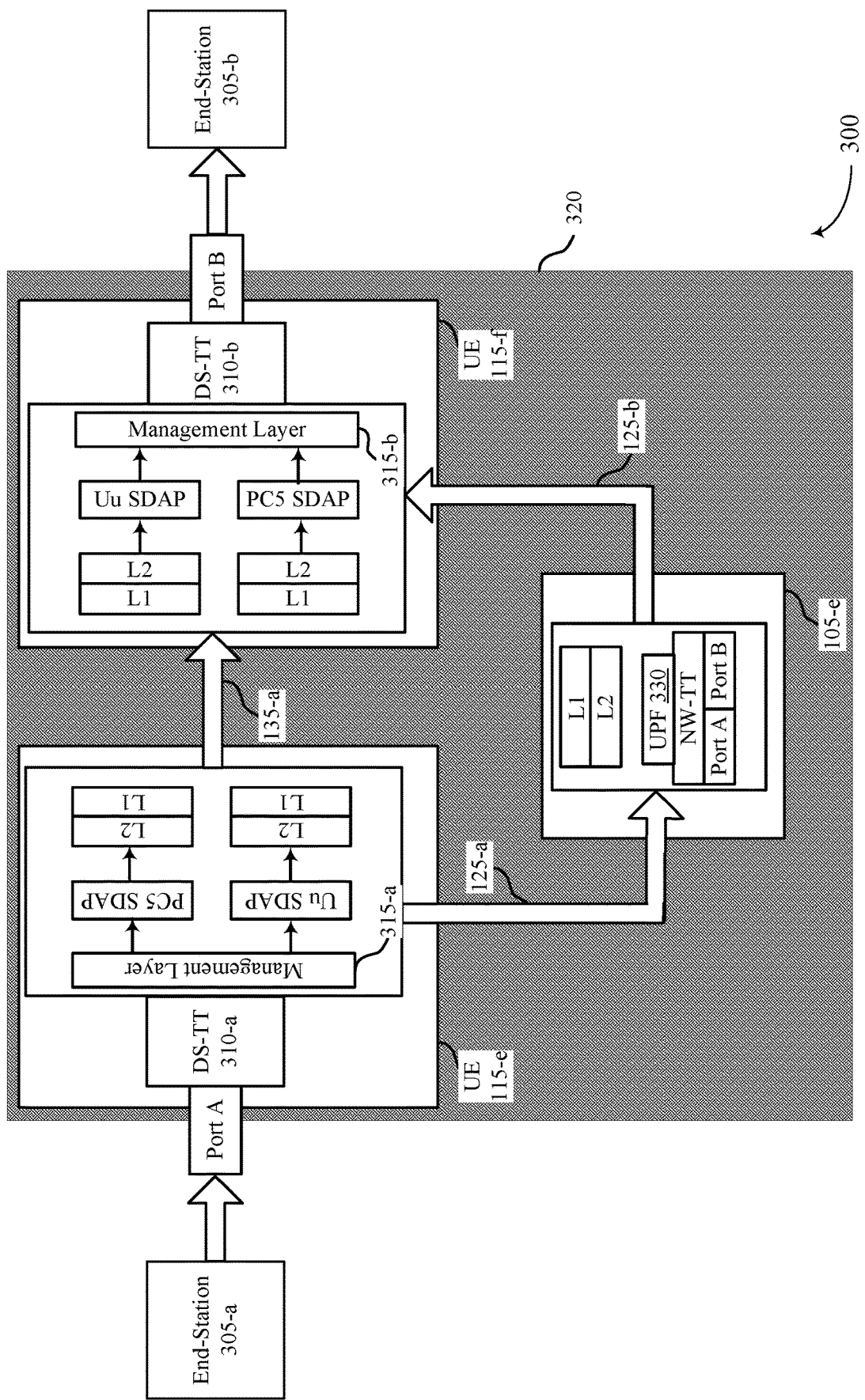
FIG. 3 illustrates an example of a TSN bridge configuration that supports TSN support over sidelink in accordance with aspects of the present disclosure.

FIG. 3 illustrates an example of a TSN bridge configuration 300 that supports TSN support over sidelink in accordance with aspects of the present disclosure. In some examples, TSN bridge configuration 300 may implement aspects of wireless communications system 100 or 200. In this example, the TSN bridge configuration 300 may include a bridge 320 that supports communications between end stations 305. Each end station 305 may be associated with a UE 115 and may be collectively referred to as a device node. The bridge 320 may also include a base station 105-*e*.

Bridge 320 may be configured to implement sidelink communications via a communication link 135-*a* based on a management layer 315. For example, the bridge 320 may support communication between a first device node (e.g., End Station 305-*a* collocated with UE 115-*e*) and a second device node (e.g., End Station 305-*b* collocated with UE 115-*f*). Each of the UE 115-*e* and the UE 115-*f* may be associated with a respective translator, DS-TT 310-*b* and 310-*b*, a respective clock for timing synchronization, and a respective management layer 315-*a* and 315-*b*. The base station 105-*e* may be associated with an NW-TT 335 for translating data packets received by (or to be transmitted to) the UE 115. The End Stations 305 may access one or more ports of the bridge 320. The bridge 320 may connect these End Station 305-*a* and 305-*b* directly or may connect the End Stations 305 to a working domain including a network, other end stations, a grandmaster clock, other bridges, etc. The TSN bridge 320 may include a number of ingress ports (not shown) that receives packets and may also include a number of egress ports (not shown). The bridge 320 may receive a number of packets and may map the packets based on a configuration. In the example of TSN bridge configuration 300, the wireless multiple access network may act like a TSN bridge and the End Stations 305 may observe a single bridge.

Each UE 115 may be associated with a DS-TT 310 that acts as an entry point for the UE 115. For example, the DS-TT 310-*a* may translate packets received from the End Station 305-*a* from a TSN language (e.g., configurations, protocols, or parameters specified for a TSN network) into a language understood by components of the wireless multiple access network (e.g., configurations, protocols, or parameters specified for the wireless multiple access network). Further each base station 105 may be associated with an NW-TT 335 that may be collocated with a UPF 330 that may act as an entry point into a working domain of the network.

A TSN system may implement sidelink communications by exposing the wireless multiple access system including the sidelink as a single TSN bridge. For example, the TSN may not be aware of the presence of the sidelink and traffic may be routed over communication links associated with Uu communications (e.g., communication link 125) or routed over communication links associated with PC5 communications (e.g., sidelink 135-*a*) according to an internal system (e.g., a set of rules) at the management layer 315.

For example, for UE-to-UE communications, the management layer 315-*a* may transmit the packet through the base station 105-*e* or through the sidelink 135-*a*, or may duplicate the packet and transmit the packet via the routes of both communication links 125 and 135-*a* after adding a link-specific header. The management layer may determine to duplicate the packet in situations where reliability or survival time constraints may not be satisfied over a single link). The management layer 315 may be generally responsible for determining whether to send TSN communications via the communication link 125 or the sidelink 135-*a*.

For bridge 320 of the TSN system, the sidelink 135-*a* may be nominally bound to the UPF 330 by the wireless multiple access system that initiates the sidelink-TSN connectivity. For example, because the sidelink communications are not necessarily transmitted through a UPF 330, the sidelink 135-*a* may be associated with a UPF ID to operate effectively. The wireless multiple access network and the UE 115 may be aware of the sidelink UPF ID through the management layer. In such TSN systems, there may be multiple bridges 320 each including a sidelink connection 135-*a* The UPF ID may indicate which bridge 320 contains which sidelink 135-*a* in such situations.

In some examples, the operations performed by the management layer 315 may instead be performed by a Packet Data Convergence Protocol (PDCP).

Figure 4:
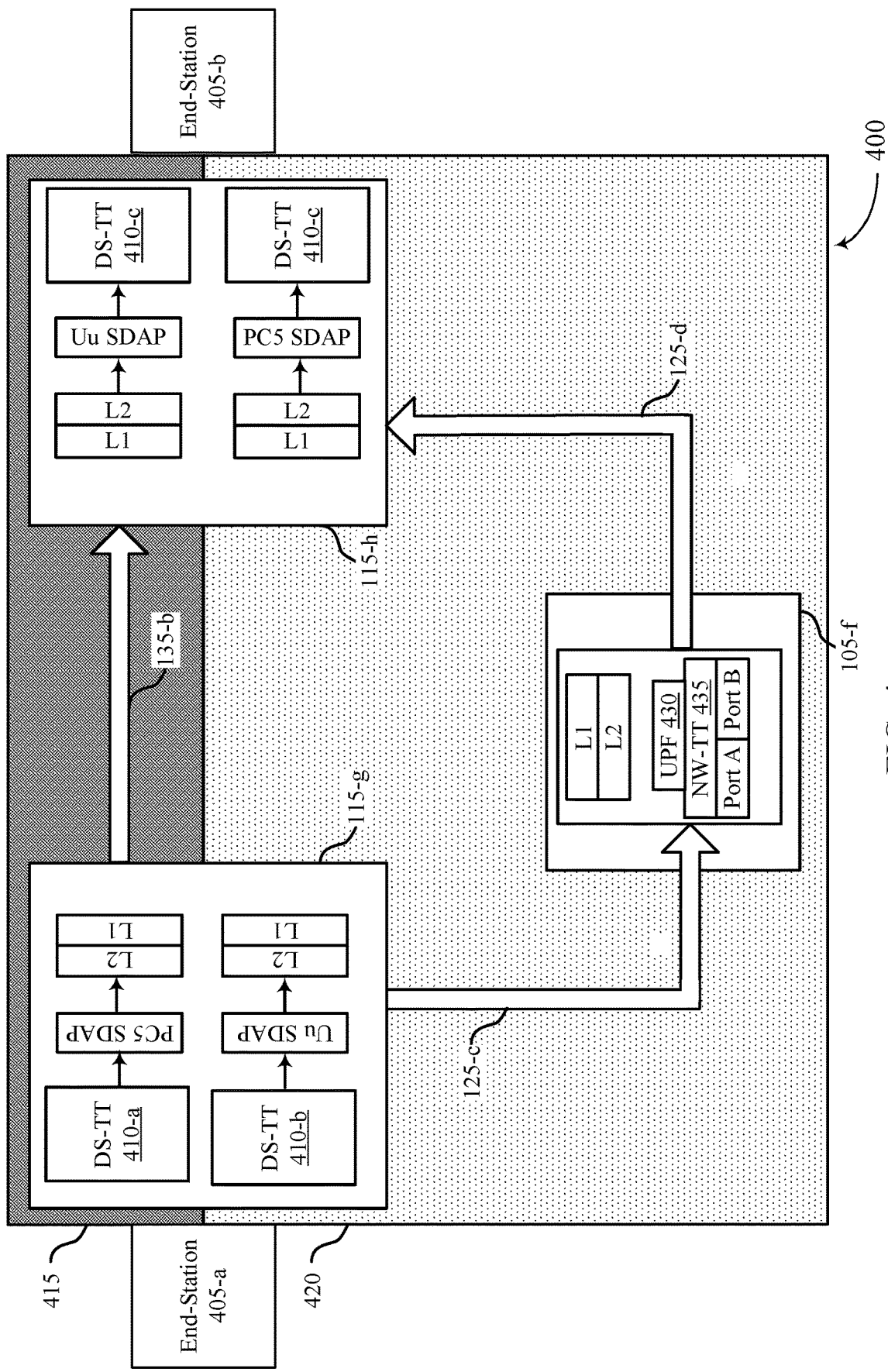
FIG. 4 illustrates an example of a TSN bridge configuration that supports TSN support over sidelink in accordance with aspects of the present disclosure.

FIG. 4 illustrates an example of a TSN bridge configuration 400 that supports TSN support over sidelink in accordance with aspects of the present disclosure. In some examples, TSN bridge configuration 400 may implement aspects of wireless communications system 100 or 200. In this example, the TSN bridge configuration 400 may include a bridge 420 and a point-to-point link 415 that support communications between end stations 305. Each end station 405 may be associated with a UE 115 and may be collectively referred to as a device node. The bridge 420 may also include a TRP or base station 105-*f*.

Point-to-point link 415 (e.g., point-to-point tunnel) may support sidelink communications via sidelink 135-*b* separate from the bridge 420. For example, the point-to-point link 415 may be a separate component (e.g., separate node of the TSN system) of the wireless multiple access system and may be exposed to the End Stations 405. The point-to-point link 415 and may, for example be a 802.1Q link.

In some examples, the point-to-point link 415 may be associated with dedicated DS-TTs 410-*a* and 410-*c* which may be allocated to sidelink communications. As such, the TSN End Stations 405 and the working domain may see the point-to-point link 415 in the network topology. Implementing sidelink communications via a point-to-point link 415 may support coverage extension, e.g., when a UE 115 is reachable only via sidelink, among other examples.

In some examples, the End Station 405-*a* may observe two separate DS-TTs 410-*a* and 410-*b* and so may access different complicated topologies, e.g., local area network topologies. The bridge 420 may communicate via DS-TT 410-*b* and a UPF 430 (e.g., through communication link 125) at the base station 105-*f* and may also communicate via the point-to-point link 415 via DS-TT 410-*a* that supports sidelink communications via communication link 135-*b*. For example, the End Station 405-*a* may choose whether to transmit TSN communications to the End Station 405-*b* via the point-to-point link 415 or the bridge 420. In some examples, the point-to-point link 415 may be associated with an ID for the sidelink communications.

Figure 5:
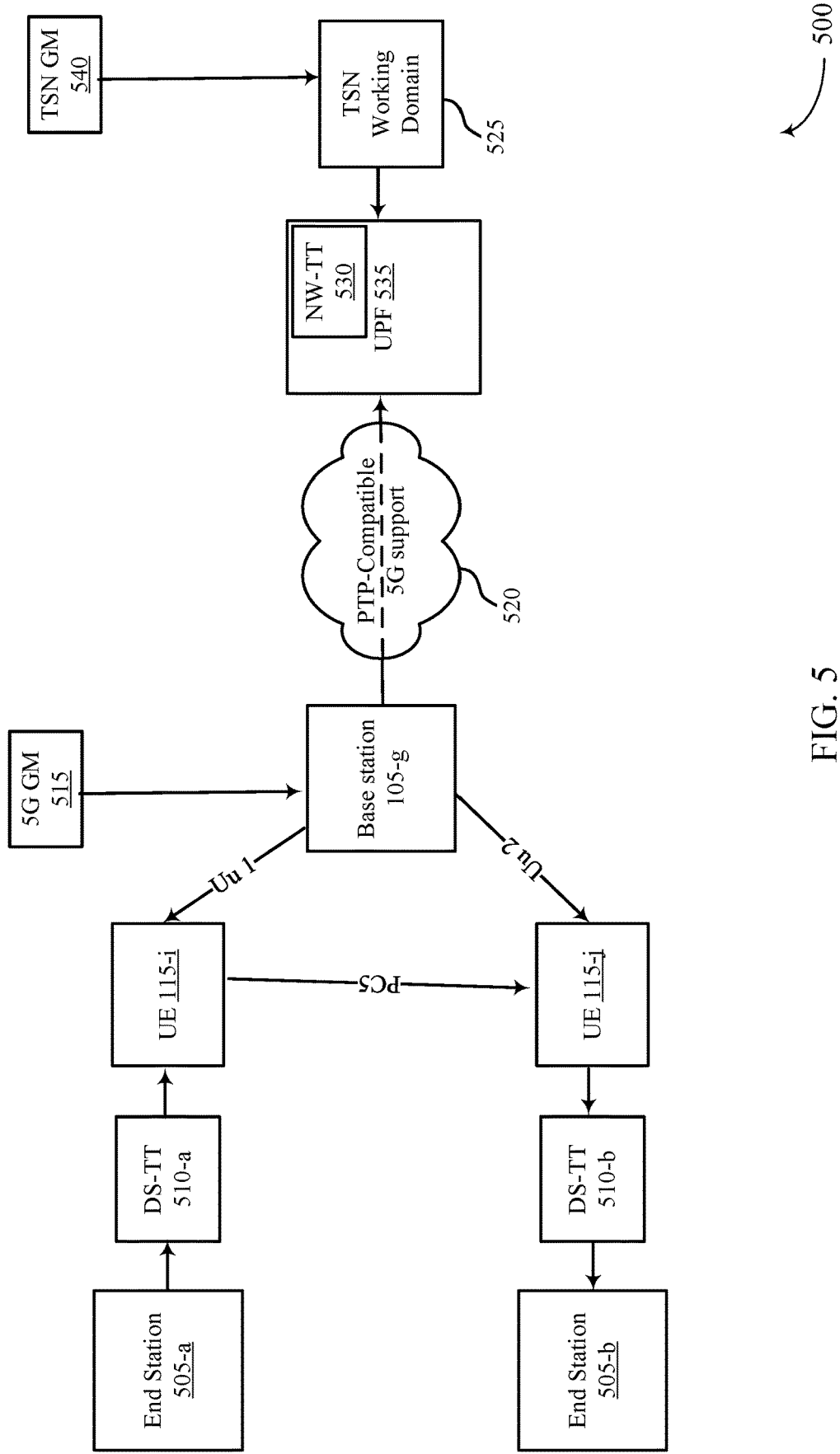
FIG. 5 illustrates an example of a timing synchronization that supports TSN support over sidelink in accordance with aspects of the present disclosure.

FIG. 5 illustrates an example of a timing synchronization 500 that supports TSN support over sidelink in accordance with aspects of the present disclosure. Timing synchronization 500 may implement aspects of wireless communications system 100 or 200 or TSN bridge configurations 300 or 400. The timing synchronization 500 may include UEs 115-*i* and 155-*j*, as well as End Stations 505-*a* and 505-*b*, DS-TT 510-*a* and 510-*b*, base station 105-*g*, 5G grandmaster clock 515, point-to-point compatible 5G support 520, UPF 535, NW-TT 530, and TSN working domain 525 which includes a TSN grandmaster clock 540 where each node of the system may be associated with one of the 5G grandmaster clock 515 or the TSN grandmaster clock 540.

In some examples, when integrating TSN over wireless multiple access sidelink, synchronization between 5G clocks and TSN clocks may support stringent timing accuracy requirements of the TSN system such as a latency condition, for example. For example, End Stations 505-*a* and 505-*b* and TSN working domain 525 may be associated with the TSN grandmaster clock 540 while DS-TT 510-*a* and 510-*b*, base station 105-*g*, point-to-point compatible 5G support 520, UPF 535, and NW-TT 530 may be associated (e.g., synched) with the 5G grandmaster clock 515. For synchronized sidelink communications between End Stations 505-*a* and 505-*b* via the wireless multiple access components of the system, the TSN grandmaster clock 540 at the End Stations 505-*a* and 505-*b* may be synchronized with the 5G grandmaster clock 515. For example, the End Stations 505-*a* and 505-*b* may be synchronized with the 5G grandmaster clock 515 based on a sib9 transmitted by the base station 105-*g*.

For example, the UE 115-*i* and 115-*j* may copy the 5G grandmaster clock 515 from base station 105-*g* to synchronize the clocks at End Stations 505-*a* and 505-*b*.

Figure 6:
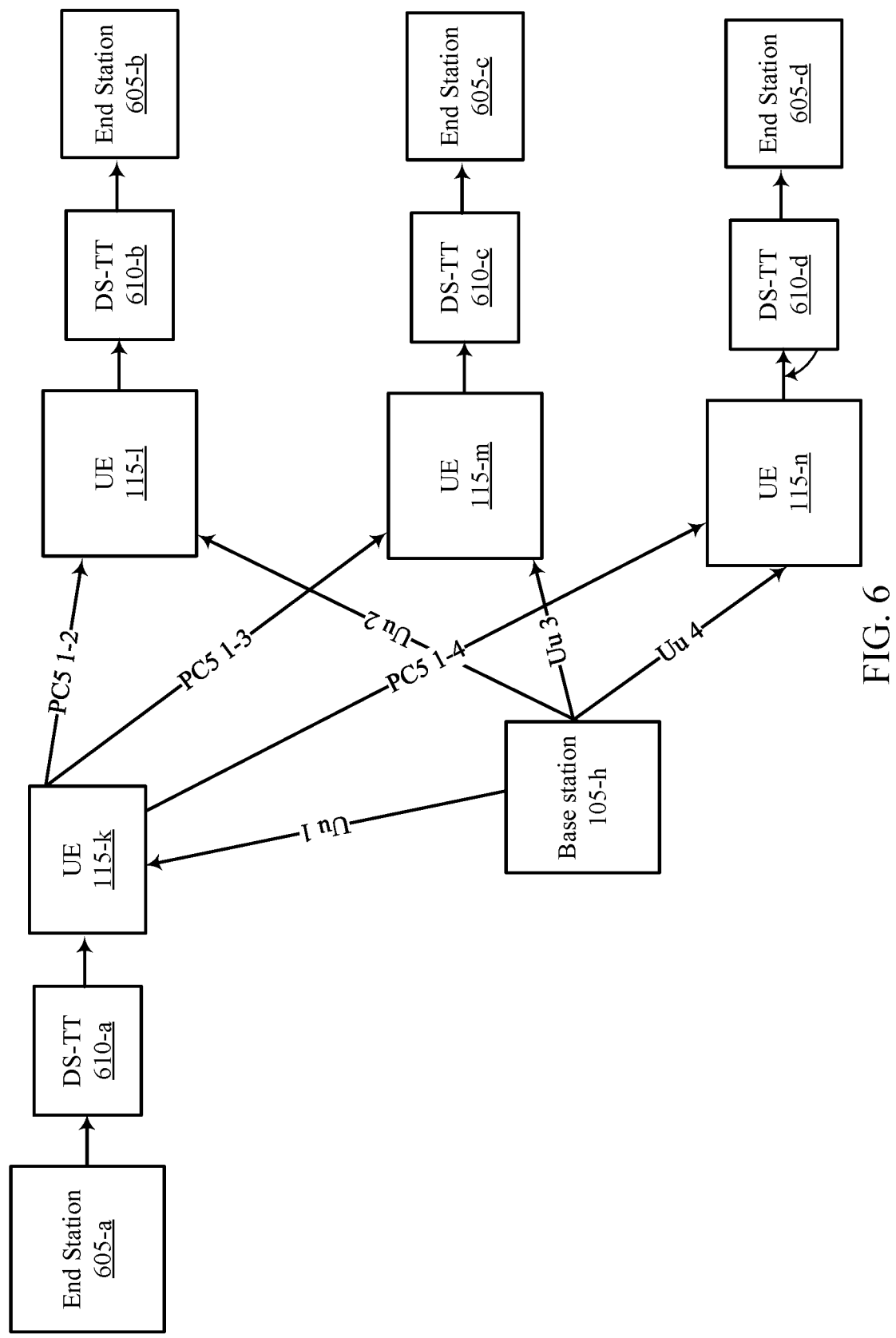
FIG. 6 illustrates an example of a scaled timing synchronization that supports TSN support over sidelink in accordance with aspects of the present disclosure.

FIG. 6 illustrates an example of a scaled timing synchronization 600 that supports TSN support over sidelink in accordance with aspects of the present disclosure. The scaled timing synchronization 600 may implement aspects of wireless communications system 100 or 200, TSN bridge configurations 300 or 400, or timing synchronization 500, or any combination thereof. The scaled timing synchronization 600 may include End Stations 605, DS-TT 610, UE 115, a number of PC5 links (e.g., sidelinks), a number of Uu links, and a base station 105-*h*.

Scaled timing synchronization may illustrate an example of UEs 115-1, 115-*m*, 115-*n* synchronizing based on the UE 115-*k*. (in the figure, UE2, UE3 and UE4 are synchronizing behind UE1). For example, the base station 105-*h* may synchronize 5G clocks associated with the UE 115 by transmitting a control message (e.g., SIB9) via Uu links 1-4, respectively. The UE 115-*k* may transmit a synchronization frame to UE 115-1, UE 115-*m*, and UE 115-*n* via the sidelink PC5 1-2, PC5 1-3, and PC5 1-4. Based on receiving the control message from the base station 105-*h*, the DS-TT 610-*b*, 610-*c*, and 610-*d* may use the 5GS time to modify the "resienceTime" field received in the sidelink synchronization frames.

Figure 7:
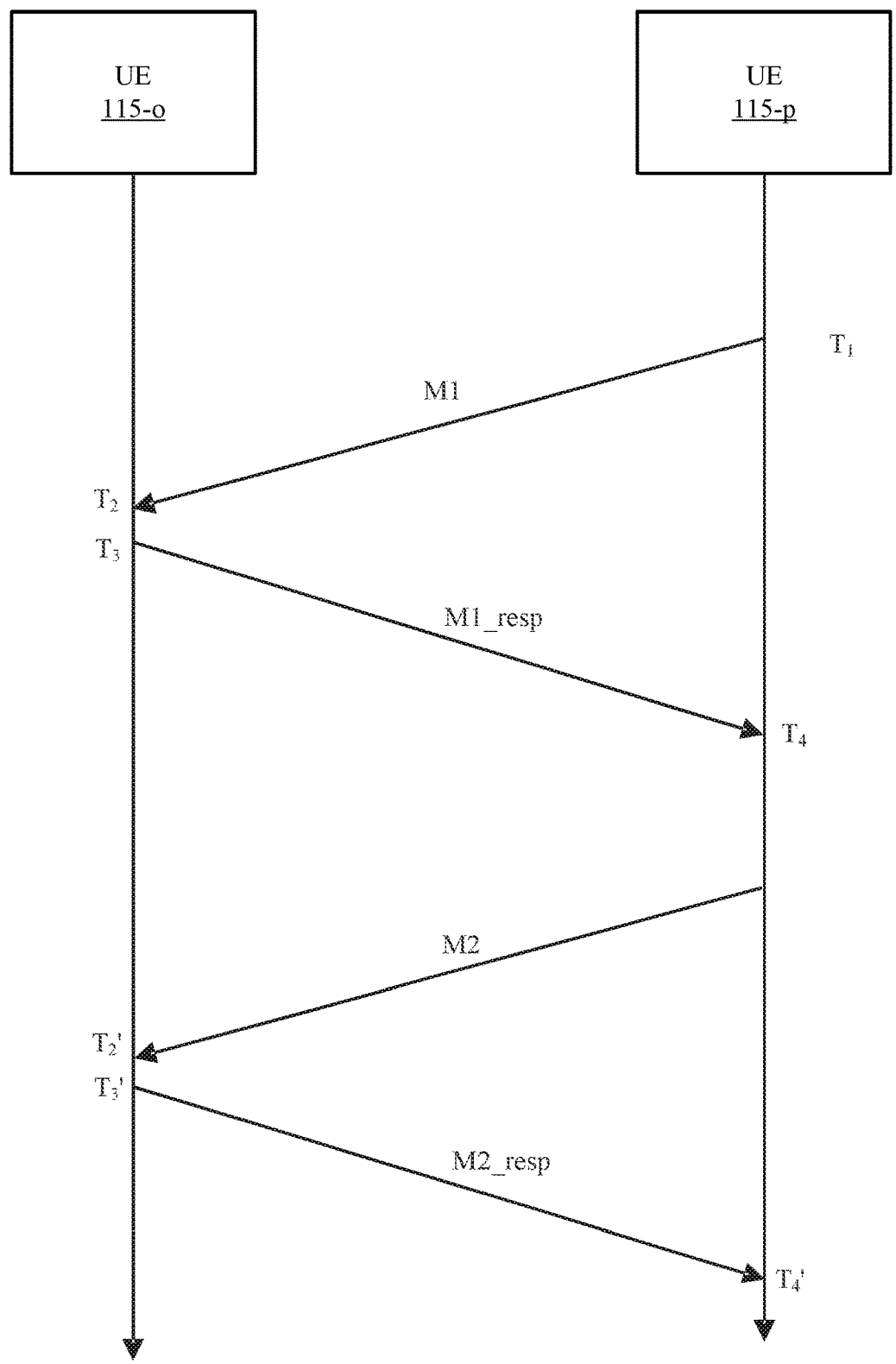
FIG. 7 illustrates an example of a timing synchronization that supports TSN support over sidelink in accordance with aspects of the present disclosure.

FIG. 7 illustrates an example of a timing synchronization 700 that supports TSN support over sidelink in accordance with aspects of the present disclosure. Timing synchronization 700 may implement aspects of wireless communications system 100 or 200 or TSN bridge configurations 300 or 400. The timing synchronization 700 may include a UE 115-*p* which may be an example of a master UE and a UE 115-*o* which may be an example of a slave UE.

UE 115-*o* and UE 115-*p* may each be associated with a clock for sidelink communications such as a local sidelink clock. The sidelink clock may be a copy of a timing from a synchronization clock associated with the wireless multiple access network (e.g., a 5 gs clock) an amount of as seen by UE 115-*p* when copied. Instead of the UE 115-*o* also copying the synchronization clock associated with the wireless multiple access network, the UE 115-*p* may copy the local sidelink clock associated with the UE 115-*p*. The UE 115-*p* may transmit its clock to UE 115-*o* directly. UE 115-*o* may retain the clock as a UE-specific clock for communicating with UE 115-*p*. The local clock at UE 115-*o* may be affected by a rate ratio and a propagation delay between UE 115-*p* to UE 115-*o*. The rate ratio may be a representation of a difference in ticking speeds of the clock at UE 115-*o* and at UE 115-*p* and the link delay may be related to a transmission delay affecting messages between the UE 115-*o* and UE 115-*p*. The UE 115-*o* may calculate the rate ratio and link delay to more accurately synchronize the clock received from UE 115-*p*.

For example, UE 115-*o* may calculate rate ratio and link delay based on a number of exchanged messages between the UE 115-*p* and the UE 115-*o*. For example, UE 115-*p* may transmit a message, M1 to the UE 115-*o* at time $T_1$. The UE 115-*o* may receive M1 at time, T2. The UE 115-*o* may transmit a message response, M1_rep to the UE 115-*p* at time, T3 and the UE 115-*p* may receive the M1_resp at time, $T_4$. The message M1 and M1_resp may be timestamped by the transmitting device (e.g., UE 115-*p* and UE 115-*o* respectively). The procedure may be repeated by transmitting messages M2 and M2_resp. M1, M1_resp, M2, and M2_resp may dedicated synchronization message and may be transmitted via radio resource control (RRC) messages. For example, M1 may have a message payload (Dialog Token=n, FollowUp Dialog Token=0) and M2 may have a message payload (DialogToken=n+1, FollowUp Dialog Token=n, Timestamp difference=$T_4$–$T_1$, Timestamp=$T_1$). Based on the time stamps of M1, and M1_rep, M2, and M2_resp, the UE 115-*o* may calculate the rate ratio with UE 115-*p* via Equation 1.

$$\text{neighbor Rate Ratio} = \frac{T'_1 - T_1}{T'_2 - T_2} \qquad [1]$$

The UE 115-*o* may also calculate link delay via Equation 2.

$$\text{link Delay} = \frac{T_4 - T_1}{T_3 - T_2} \qquad [2]$$

Through such a message exchange, the UE 115-*o* may use the calculated rate ratio and link delay to increase the accuracy of the clock received from UE 115-*p*. For example, the UE 115-*o* may transmit the rate ratio and link delay to an associated DS-TT along with UE 115-*p* clock reading to obtain an accurate copy of the local clock of UE 115-*p* at UE 115-*o*.

Figure 8:
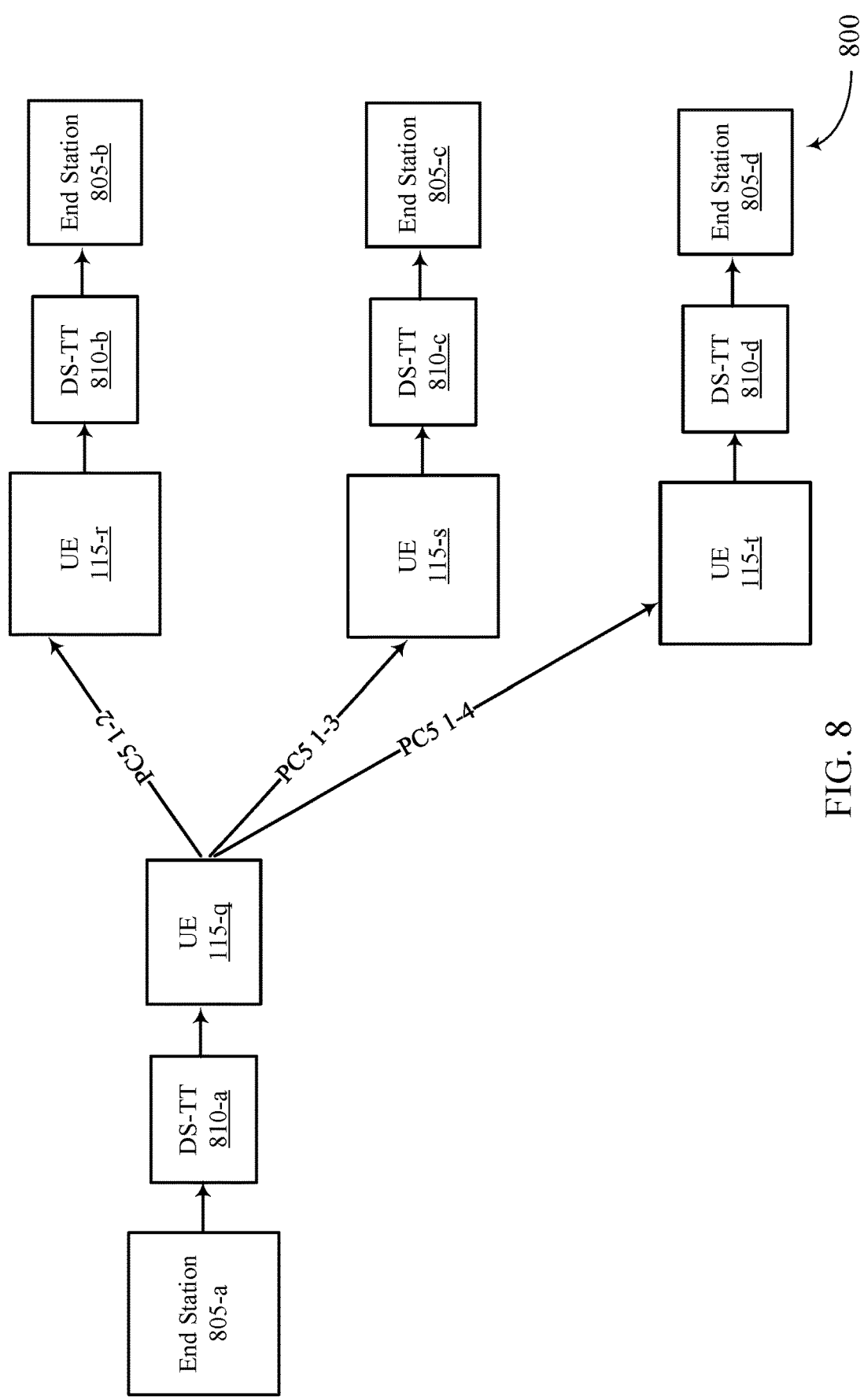
FIG. 8 illustrates an example of a scaled timing synchronization that supports TSN support over sidelink in accordance with aspects of the present disclosure.

FIG. 8 illustrates an example of a scaled timing synchronization 800 that supports TSN support over sidelink in accordance with aspects of the present disclosure. The scaled timing synchronization 800 may implement aspects of wireless communications system 100 or 200, TSN bridge configurations 300 or 400, or timing synchronization 700, or any combination thereof. The scaled timing synchronization 800 may include End Stations 805, DS-TT 810, UE 115 and a number of PC5 links (e.g., sidelinks).

In some examples, UE 115-*q* may be an example of a mater UE and UEs 115-*r*, 115-*s*, and 115-*t* may be examples of slave UEs. The UE 115-*q* may perform a timing synchronization procedure as described with reference to FIG. 7, with each of UEs 115-*r*, 115-*s*, and 115-*t*. For example, the UE 115-*q* may transmit a synchronization frame to UE 115-*r* via PS5 1-2, to UE 115-*s* via PS5 1-3, and to UE 115-*t* via PS5 1-4. Each of DS-TT 810-*b*, 810-*c*, and 801-*d* may store a copy of the clock received in the synchronization frame from UE 115-*q* for communicating with UE 115-*q*. For example, DS-TT 810-*b*, 810-*c*, and 801-*d* may use the local copy of the UE 115-*q* clock time to modify the "resienceTime" field or another field in the sidelink synchronization frames based on the calculated rate ratio and link delay. In some examples, the TSN system may implement local clock synchronization in system with relatively few clocks or in portions of a system (e.g., in a subset of a total number of UEs) having relatively higher synchronization or timing requirements.

Figure 9:
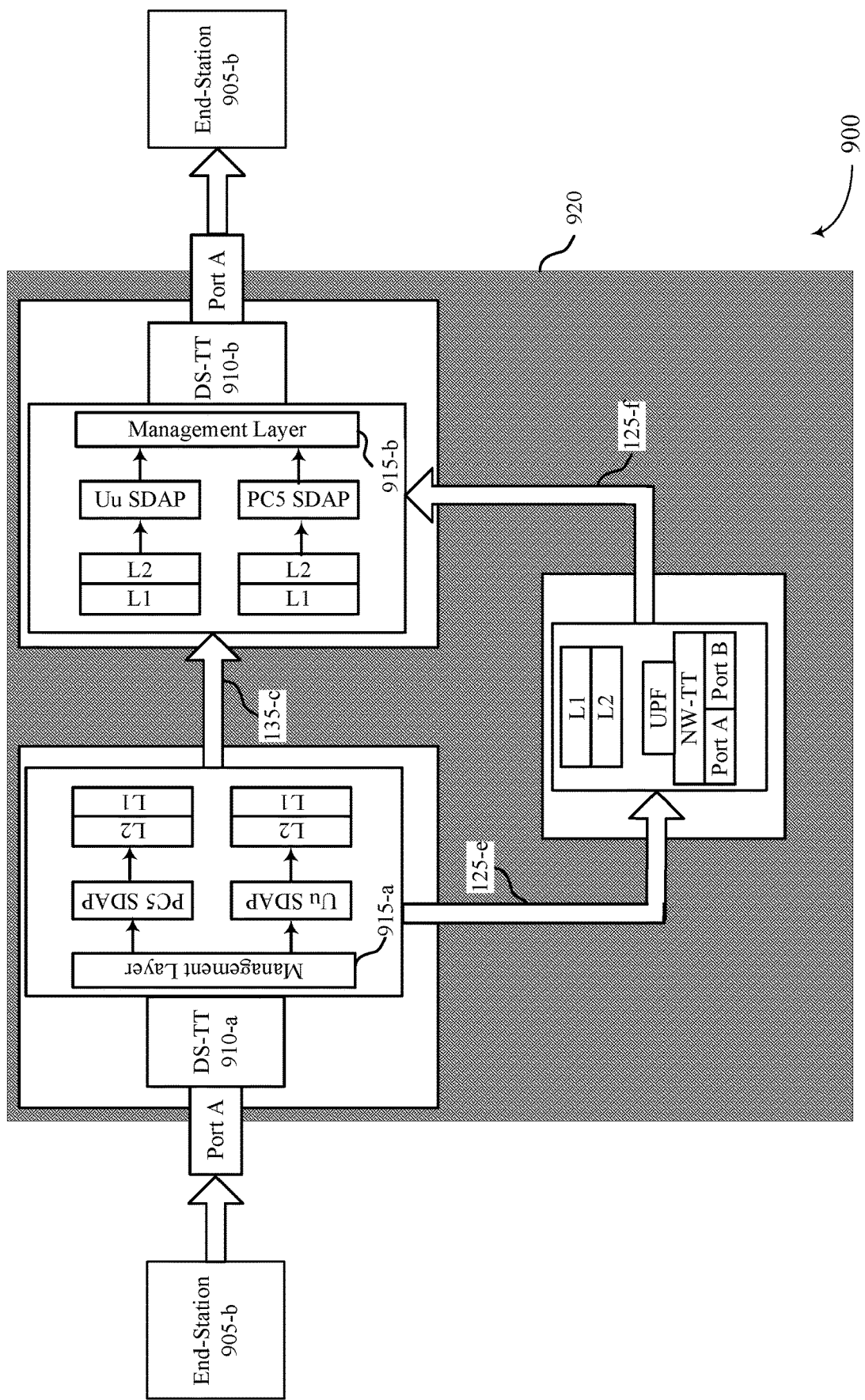
FIG. 9 illustrates an example of a wireless communications system that supports TSN support over sidelink in accordance with aspects of the present disclosure.

FIG. 9 illustrates an example of a wireless communications system 900 that supports TSN support over sidelink in accordance with aspects of the present disclosure. The wireless communications system 900 may implement aspects of wireless communications system 100 or 200, or TSN bridge configuration 300. The wireless communications system 900 may support QoS reporting for a single bridge architecture and may include, end stations 905, DS-TT 910, management layers 915, and communication links 135-c and 125.

End stations 905 may use QoS information to efficiently communicate with each other. In general, QoS characteristics may describe the packet forwarding treatment that a QoS Flow may receive between the UE and a UPF of a base station in terms of the following performance characteristics: resource type (guaranteed bit rate (GBR), Delay critical GBR, or Non-GBR); priority level, packet delay budget (PDB), packet error rate, averaging window (for GBR and delay-critical GBR resource types), maximum data burst volume (MDBV) (for Delay-critical GBR resource types). The QoS characteristics should be understood as guidelines for setting node specific parameters for each QoS Flow e.g., for radio access link layer protocol configurations. Standardized or pre-configured QoS characteristics, may be indicated through the 5QI value. For example, TSC QoS Flows may use a delay critical GBR resource types and TSC assistance information for TSN communications (e.g., TSC communications transmitted or relayed via a TSN bridge). TSC QoS Flows may use standardized 5QIs, pre-configured 5QIs, or dynamically assigned 5QI values as the QoS parameter. In such examples, a TSC burst size may be used to set the MDBV rate. PDB defines an upper bound for the time that a packet may be delayed between the UE and the UPF that terminates the N6 interface at the gNB. The PDB may be explicitly divided into access node PDB and control node PDB. PQI may be similarly used for TSC QoS flows based on PDB and MDBV where the parameter "Hold&Forward" on sidelink may be left to UE DS-TT implementation. A TSN network may use bridge/link parameters such as "independentDelayMax" and "independentDelayMin/dependentDelayMax" and "dependentDelayMin.=>" for sidelink communications.

For example, the management layer 915-a or management layer 915-b may use 5QI to estimate a round trip delay over communication link 125 and PQI to estimate latency over the communication link 135-c. The management layer 915-a or 915-b may determine an aggregate QoS parameter and may report the parameter to the DS-TT 910-a or 910-b respectively. The DS-TT 910-a or 910-b report the aggregate QoS parameter as a total bridge latency to the End Stations 905-a or 905-b, respectively. For example, the management layers 915 may use 5QI procedures to calculate a communication link 125 bridge delay (e.g., a Uu bridge delay) and may pass the bridge delay to the sidelink as a PQI requirement. The management layer 915 may incorporate the sidelink communication link 135-c and may combine the 5QI of the communication link 125 with the PQI of the communication link 135-c and may determine as combined QoS indicator (e.g., an overall bridge configuration) and may report, to the DS-TTs 910, the indicator as a single report or value. In some examples, the QoS indicator may be a maximum latency, a minimum latency, or an intermediate value therewith depending on an implementation of the management layer 915.

Figure 10:
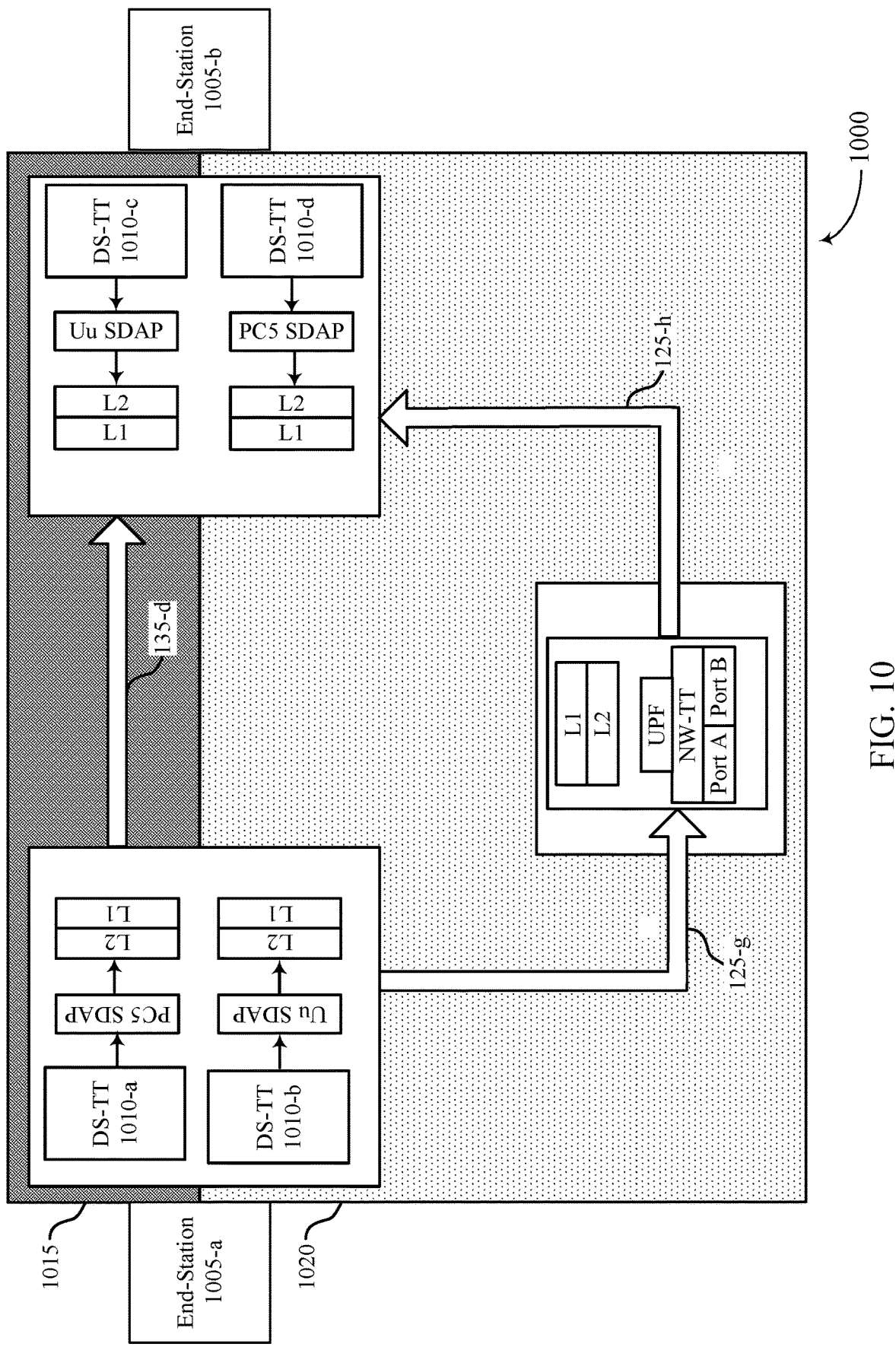
FIG. 10 illustrates an example of a wireless communications system that supports TSN support over sidelink in accordance with aspects of the present disclosure.

FIG. 10 illustrates an example of a wireless communications system 1000 that supports TSN support over sidelink in accordance with aspects of the present disclosure. The wireless communications system 1000 may implement aspects of wireless communications system 100 or 200, or TSN bridge configuration 400. The wireless communications system 1000 may support QoS reporting for an exposed sidelink bridge architecture and may include, end stations 1005, DS-TT 1010, sidelink bridge 1015, TSN bridge 1020, and communication links 135-d and 125.

For example, the DS-TT 1010-b may use 5QI to estimate a round trip delay over communication link 125 via bridge 1020 and the DS-TT 1010-a may use PQI to estimate latency (e.g., a maximum delay) over the communication link 135-d via point-to-point link 1015. The DS-TT 1010-a and 1010-b may separately report link delays to nodes of the TSN system (e.g., TSN application functions associated with a respective End Station 1005).

Figure 11:
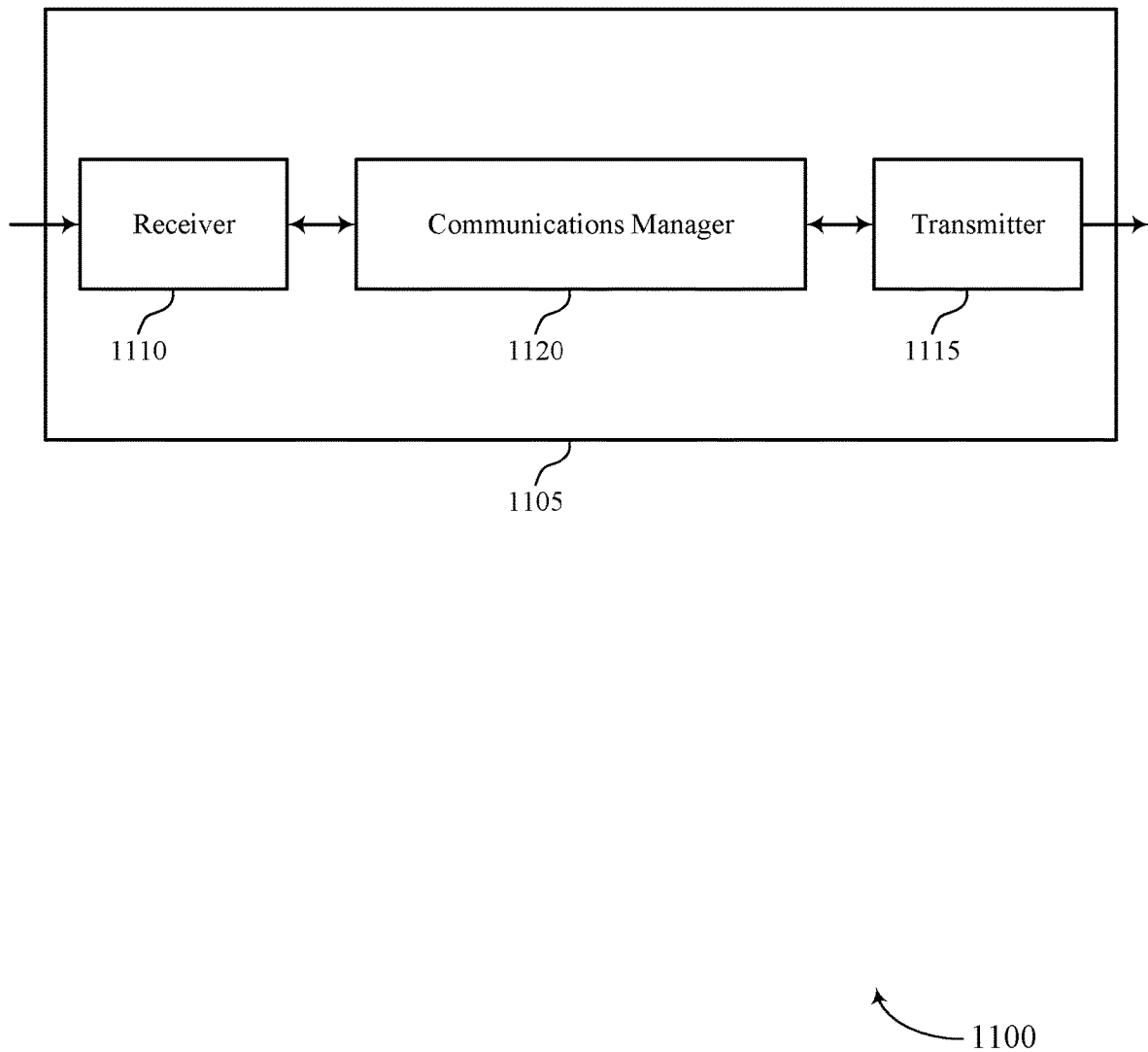
FIGS. 11 and 12 show block diagrams of devices that support TSN support over sidelink in accordance with aspects of the present disclosure.

FIG. 11 shows a block diagram 1100 of a device 1105 that supports TSN support over sidelink in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to TSN support over sidelink). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to TSN support over sidelink). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of TSN support over sidelink as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

For example, the communications manager 1120 may be configured as or otherwise support a means for receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The communications manager 1120 may be configured as or otherwise support a means for identifying data to transmit from the first device node to a second device node of the set of multiple nodes. The communications manager 1120 may be configured as or otherwise support a means for communicating with the second device node via a sidelink connection associated with the wireless radio access network.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption via sidelink communications in a TSN system implementing wireless multiple access components.

Figure 12:
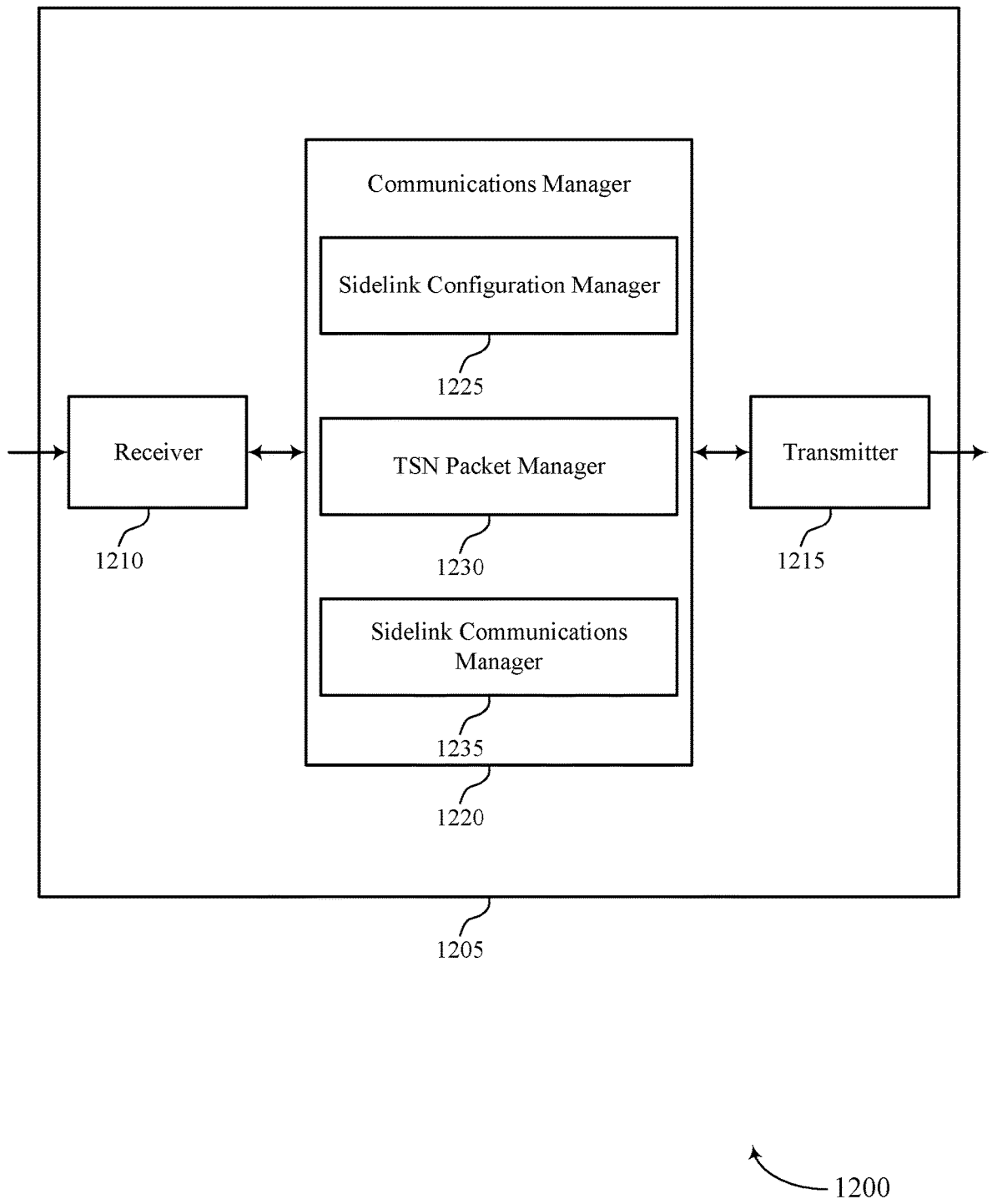

FIG. 12 shows a block diagram 1200 of a device 1205 that supports TSN support over sidelink in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to TSN support over sidelink). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to TSN support over sidelink). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of TSN support over sidelink as described herein. For example, the communications manager 1220 may include a sidelink configuration manager 1225, an TSN packet manager 1230, a sidelink communications manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The sidelink configuration manager 1225 may be configured as or otherwise support a means for receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The TSN packet manager 1230 may be configured as or otherwise support a means for identifying data to transmit from the first device node to a second device node of the set of multiple nodes. The sidelink communications manager 1235 may be configured as or otherwise support a means for communicating with the second device node via a sidelink connection associated with the wireless radio access network.

Figure 13:
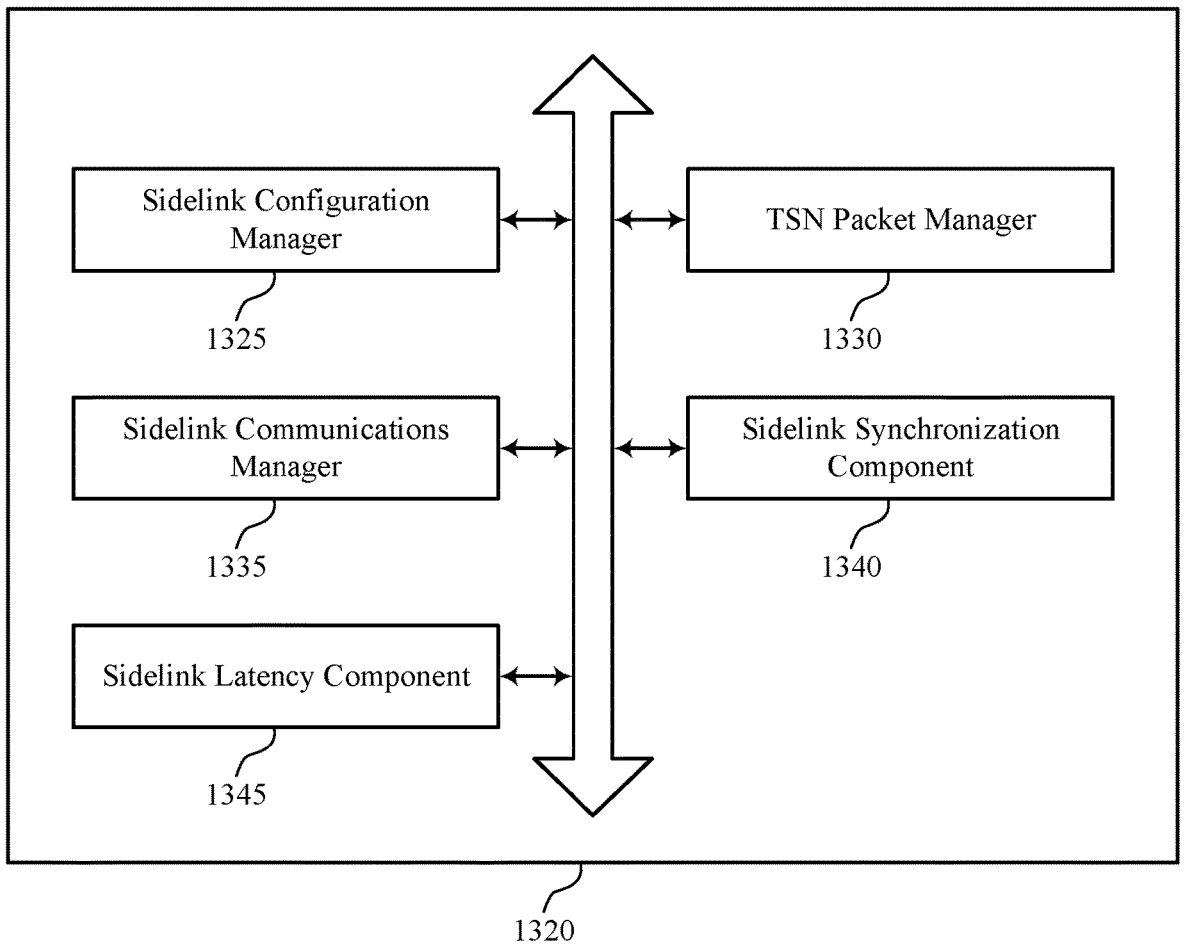
FIG. 13 shows a block diagram of a communications manager that supports TSN support over sidelink in accordance with aspects of the present disclosure.

FIG. 13 shows a block diagram 1300 of a communications manager 1320 that supports TSN support over sidelink in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of TSN support over sidelink as described herein.

For example, the communications manager 1320 may include a sidelink configuration manager 1325, an TSN packet manager 1330, a sidelink communications manager 1335, a sidelink synchronization component 1340, a sidelink latency component 1345, or any combination thereof. Each of these components may communicate, directly or indirectly, with one another (e.g., via one or more buses).

The sidelink configuration manager 1325 may be configured as or otherwise support a means for receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The TSN packet manager 1330 may be configured as or otherwise support a means for identifying data to transmit from the first device node to a second device node of the set of multiple nodes. The sidelink communications manager 1335 may be configured as or otherwise support a means for communicating with the second device node via a sidelink connection associated with the wireless radio access network.

In some examples, the sidelink connection is configured as a link within the bridge associated with the wireless radio access network.

In some examples, to support communicating with the second device node via the sidelink connection, the sidelink communications manager 1335 may be configured as or otherwise support a means for transmitting the data to a management layer within the bridge associated with the wireless radio access network.

In some examples, the sidelink connection is associated with a single user plane function identifier.

In some examples, the management layer is configured to interface between one or more components of the sidelink connection and one or more components associated with the first device node.

In some examples, the sidelink connection is configured as an exposed link of the time-sensitive network.

In some examples, the sidelink connection is associated with a device-side time-sensitive network translator of the time-sensitive network. In some examples, the device-side time-sensitive network translator is exposed to the first device node.

In some examples, to support communicating with the second device node via the sidelink connection, the sidelink communications manager 1335 may be configured as or otherwise support a means for transmitting the data to the device-side time-sensitive network translator of the time-sensitive network.

In some examples, the wireless radio access network is associated with a second dedicate time-sensitive network translator separate from the device-side time-sensitive network translator associated with the sidelink connection.

In some examples, the sidelink synchronization component 1340 may be configured as or otherwise support a means for determining a synchronization timing at the first device node based on a synchronization clock associated with the wireless radio access network.

In some examples, the sidelink synchronization component 1340 may be configured as or otherwise support a means for transmitting, to the second device node, a sidelink synchronization frame including an indication of the synchronization timing.

In some examples, a time-sensitive network translator is configured to modify the indication of the synchronization timing based on the synchronization clock associated with the wireless radio access network.

In some examples, the sidelink synchronization component 1340 may be configured as or otherwise support a means for determining a synchronization timing at the first device node based on a local clock at the first device node that is configured for sidelink communications.

In some examples, the sidelink synchronization component 1340 may be configured as or otherwise support a means for transmitting, to the second device node, a timestamped synchronization message. In some examples, the sidelink synchronization component 1340 may be configured as or otherwise support a means for receiving a response to the timestamped synchronization message, where determining the synchronization timing is based on receiving the response.

In some examples, the sidelink synchronization component 1340 may be configured as or otherwise support a means for transmitting the determined synchronization timing to a time-sensitive network translator associated with the second device node.

In some examples, the local clock at the first device node is a copy of a synchronization clock associated with the wireless radio access network.

In some examples, the sidelink latency component 1345 may be configured as or otherwise support a means for determining the latency condition of the time-sensitive network based on a latency threshold associated with the wireless radio access network. In some examples, the sidelink latency component 1345 may be configured as or otherwise support a means for transmitting the latency condition to a time-sensitive network translator associated with the second device node.

In some examples, to support determining the latency condition, the sidelink latency component 1345 may be configured as or otherwise support a means for determining a latency threshold associated with sidelink communications based on a delay associated with sidelink communications. In some examples, to support determining the latency condition, the sidelink latency component 1345 may be configured as or otherwise support a means for combining the latency threshold associated with the wireless radio access network with the latency threshold associated with sidelink communications.

In some examples, to support transmitting the latency condition, the sidelink latency component 1345 may be configured as or otherwise support a means for transmitting the combination of the latency threshold associated with the wireless radio access network and the latency threshold associated with sidelink communications to the time-sensitive network translator.

In some examples, the sidelink latency component 1345 may be configured as or otherwise support a means for transmitting an indication of the latency condition of the time-sensitive network to an application function associated with the first device node.

In some examples, the sidelink latency component 1345 may be configured as or otherwise support a means for determining the latency condition of the time-sensitive network based on a quality of service metric associated with the first device node.

Figure 14:
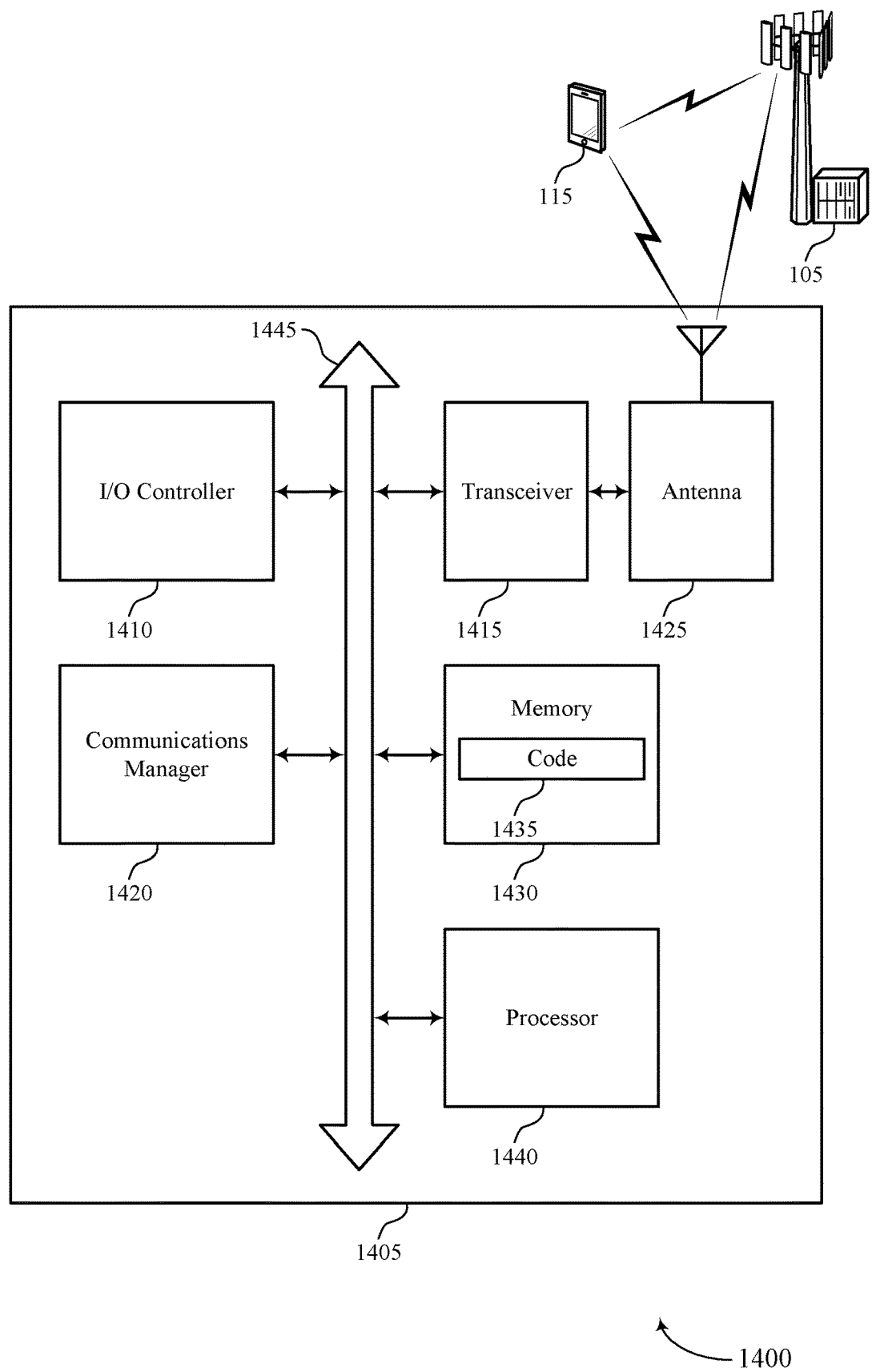
FIG. 14 shows a diagram of a system including a device that supports TSN support over sidelink in accordance with aspects of the present disclosure.

FIG. 14 shows a diagram of a system 1400 including a device 1405 that supports TSN support over sidelink in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting TSN over sidelink). For example, the device 1405 or a component of the device 1405 may include a processor 1440 and memory 1430 coupled to the processor 1440, the processor 1440 and memory 1430 configured to perform various functions described herein.

For example, the communications manager 1420 may be configured as or otherwise support a means for receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The communications manager 1420 may be configured as or otherwise support a means for identifying data to transmit from the first device node to a second device node of the set of multiple nodes. The communications manager 1420 may be configured as or otherwise support a means for communicating with the second device node via a sidelink connection associated with the wireless radio access network.

By including or configuring the communications manager 1420 in accordance with examples as described herein, the device 1405 may support techniques for improved communication reliability, reduced latency, higher reliability for sidelink communications in a TSN system implementing one or more wireless multiple access network components.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of TSN support over sidelink as described herein, or the processor 1440 and the memory 1430 may be otherwise configured to perform or support such operations.

Figure 15:
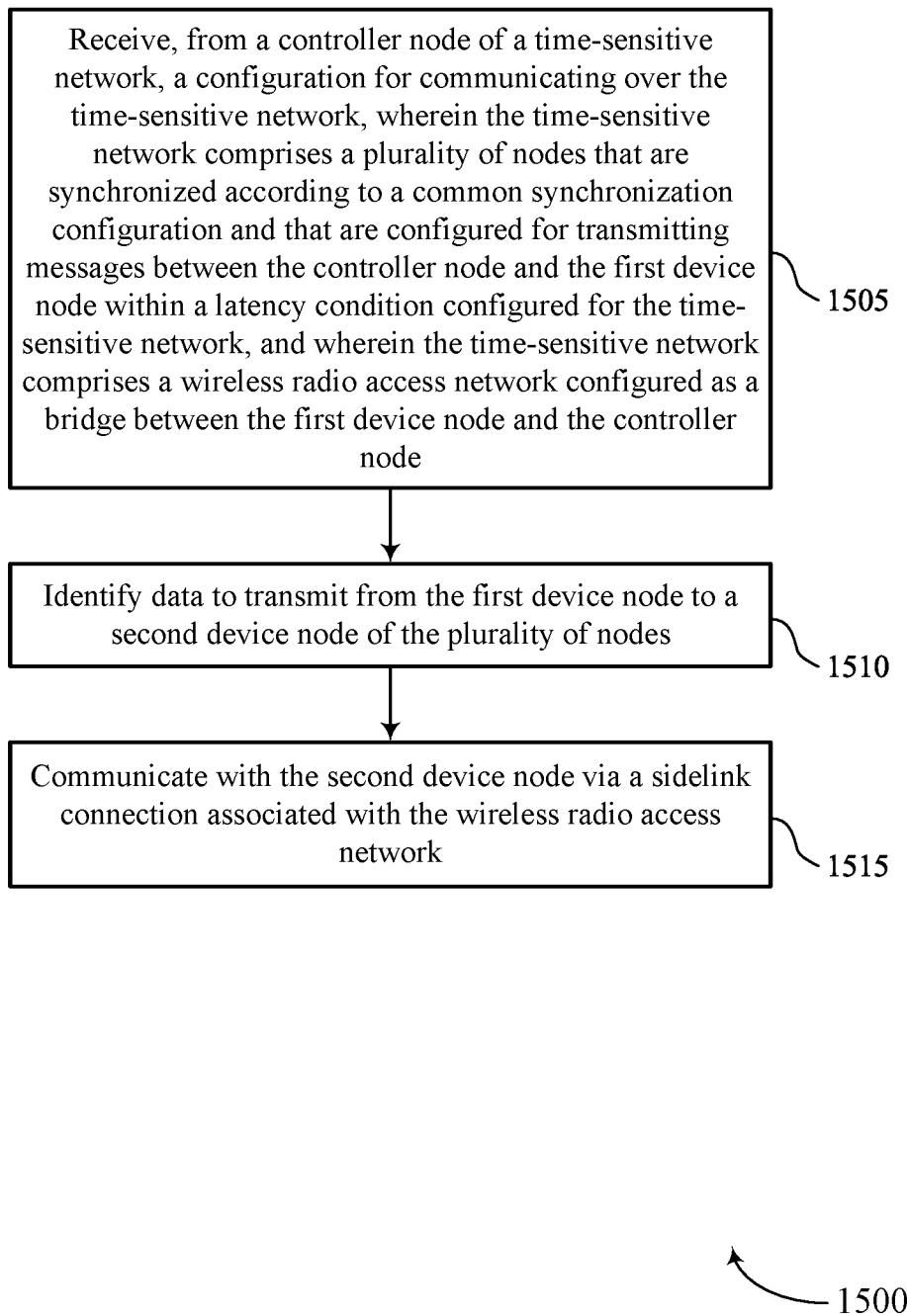
FIGS. 15 through 21 show flowcharts illustrating methods that support TSN support over sidelink in accordance with aspects of the present disclosure.

FIG. 15 shows a flowchart illustrating a method 1500 that supports TSN support over sidelink in accordance with aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1505, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 1505 may be performed in accordance with examples as disclosed herein. In some examples, aspects of the operations of 1505 may be performed by a sidelink configuration manager 1325 as described with reference to FIG. 13.

At 1510, the method may include identifying data to transmit from the first device node to a second device node of the set of multiple nodes. The operations of 1510 may be performed in accordance with examples as disclosed herein. In some examples, aspects of the operations of 1510 may be performed by an TSN packet manager 1330 as described with reference to FIG. 13.

At 1515, the method may include communicating with the second device node via a sidelink connection associated with the wireless radio access network. The operations of 1515 may be performed in accordance with examples as disclosed herein. In some examples, aspects of the operations of 1515 may be performed by a sidelink communications manager 1335 as described with reference to FIG. 13.

Figure 16:
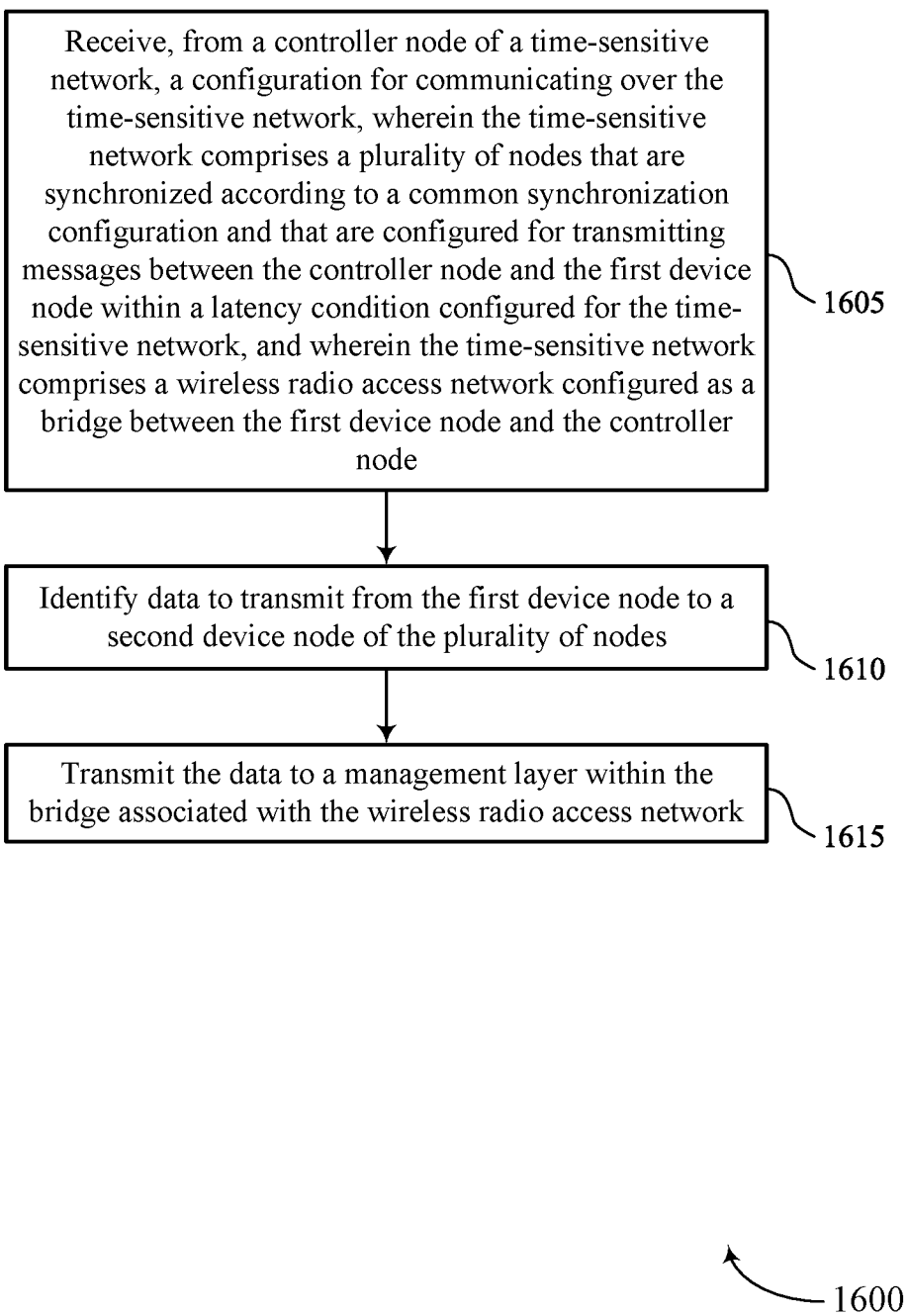

FIG. 16 shows a flowchart illustrating a method 1600 that supports TSN support over sidelink in accordance with aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1605, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 1605 may be performed in accordance with examples as disclosed herein. In some examples, aspects of the operations of 1605 may be performed by a sidelink configuration manager 1325 as described with reference to FIG. 13.

At 1610, the method may include identifying data to transmit from the first device node to a second device node of the set of multiple nodes. The operations of 1610 may be performed in accordance with examples as disclosed herein. In some examples, aspects of the operations of 1610 may be performed by an TSN packet manager 1330 as described with reference to FIG. 13.

At 1615, the method may include transmitting the data to a management layer within the bridge associated with the wireless radio access network. The operations of 1620 may be performed in accordance with examples as disclosed herein. In some examples, aspects of the operations of 1620 may be performed by a sidelink communications manager 1335 as described with reference to FIG. 13.

Figure 17:
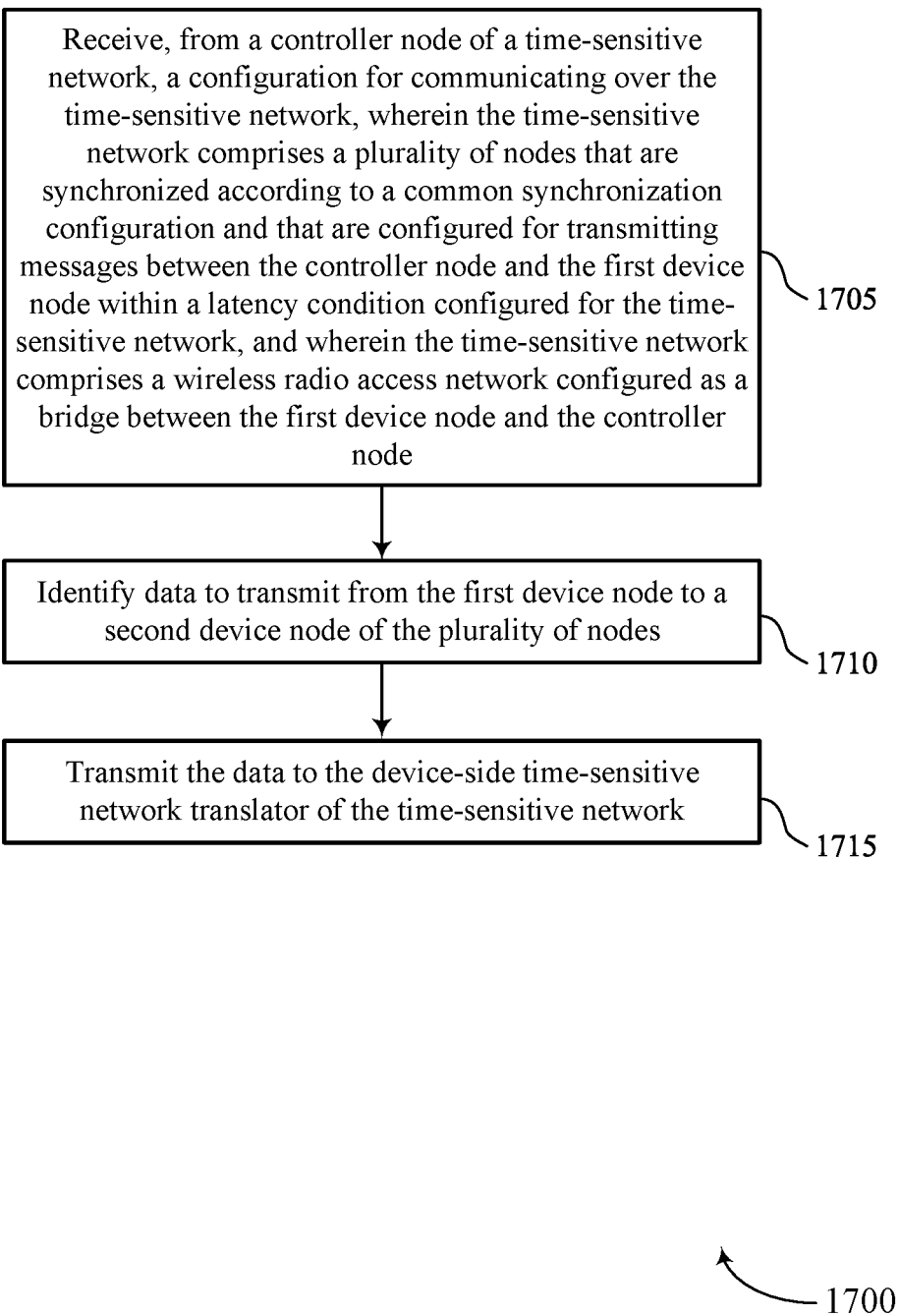

FIG. 17 shows a flowchart illustrating a method 1700 that supports TSN support over sidelink in accordance with aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1705, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 1705 may be performed in accordance with examples as disclosed herein. In some examples, aspects of the operations of 1705 may be performed by a sidelink configuration manager 1325 as described with reference to FIG. 13.

At 1710, the method may include identifying data to transmit from the first device node to a second device node of the set of multiple nodes. The operations of 1710 may be performed in accordance with examples as disclosed herein. In some examples, aspects of the operations of 1710 may be performed by an TSN packet manager 1330 as described with reference to FIG. 13.

At 1715, the method may include transmitting the data to the device-side time-sensitive network translator of the time-sensitive network. The operations of 1730 may be performed in accordance with examples as disclosed herein. In some examples, aspects of the operations of 1730 may be performed by a sidelink communications manager 1335 as described with reference to FIG. 13.

Figure 18:
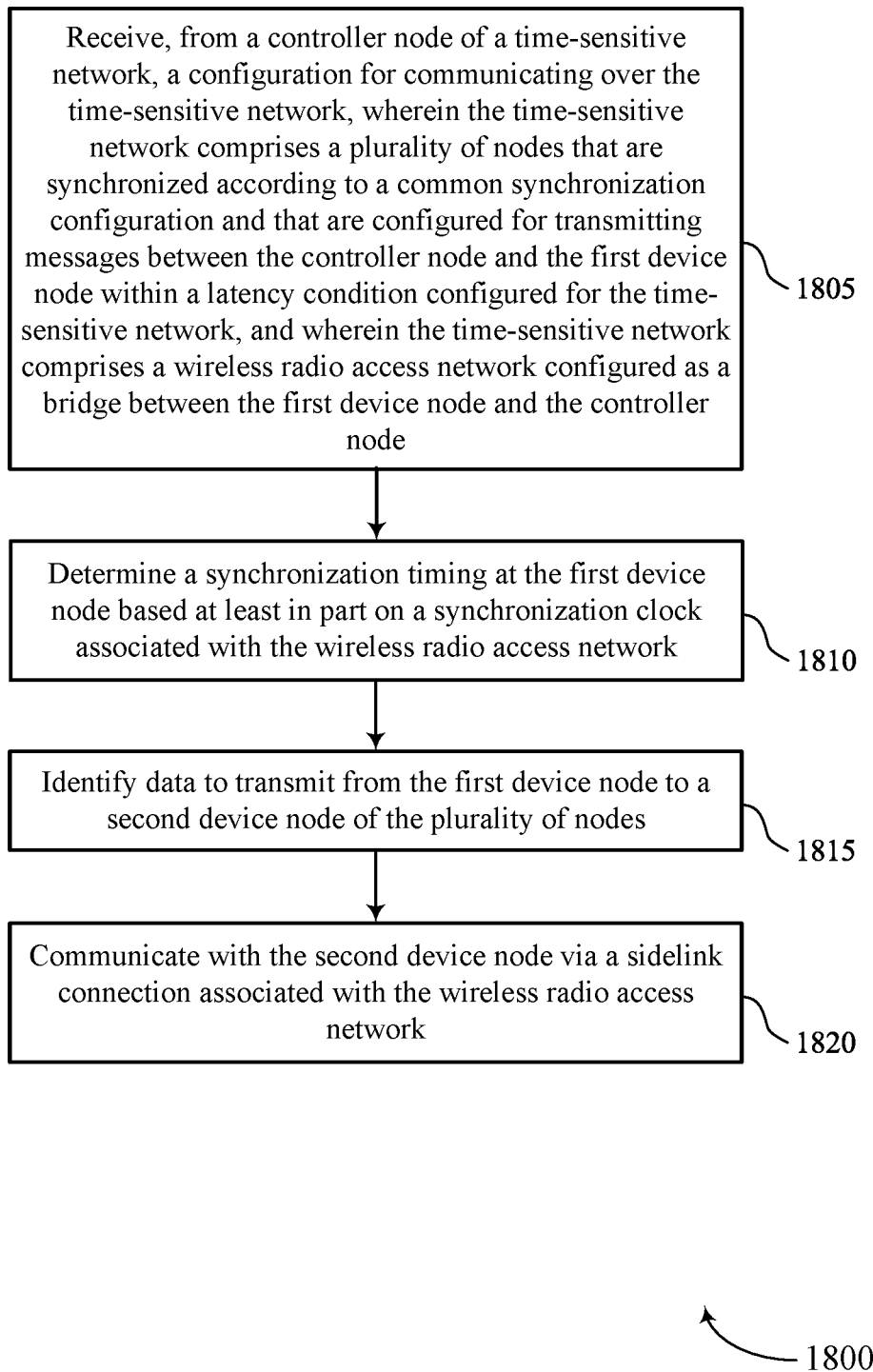

FIG. 18 shows a flowchart illustrating a method 1800 that supports TSN support over sidelink in accordance with aspects of the present disclosure. The operations of the method 1800 may be implemented by a UE or its components as described herein. For example, the operations of the method 1800 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1805, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 1805 may be performed in accordance with examples as disclosed herein. In some examples, aspects of the operations of 1805 may be performed by a sidelink configuration manager 1325 as described with reference to FIG. 13.

At 1810, the method may include determining a synchronization timing at the first device node based on a synchronization clock associated with the wireless radio access network. The operations of 1810 may be performed in accordance with examples as disclosed herein. In some examples, aspects of the operations of 1810 may be performed by a sidelink synchronization component 1340 as described with reference to FIG. 13.

At 1815, the method may include identifying data to transmit from the first device node to a second device node of the set of multiple nodes. The operations of 1815 may be performed in accordance with examples as disclosed herein. In some examples, aspects of the operations of 1815 may be performed by an TSN packet manager 1330 as described with reference to FIG. 13.

At 1820, the method may include communicating with the second device node via a sidelink connection associated with the wireless radio access network. The operations of 1820 may be performed in accordance with examples as disclosed herein. In some examples, aspects of the operations of 1820 may be performed by a sidelink communications manager 1335 as described with reference to FIG. 13.

Figure 19:
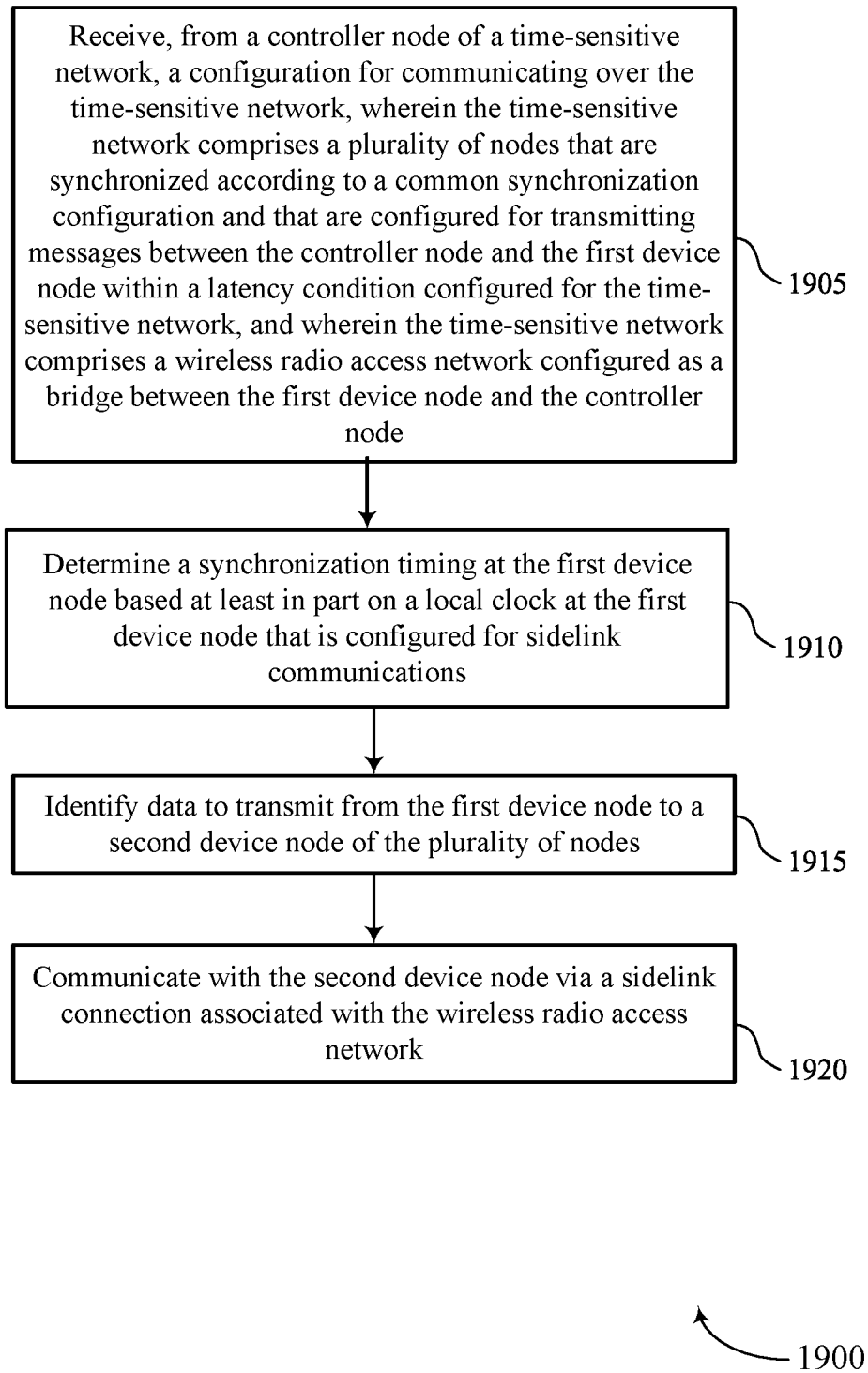

FIG. 19 shows a flowchart illustrating a method 1900 that supports TSN support over sidelink in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 1905 may be performed in accordance with examples as disclosed herein. In some examples, aspects of the operations of 1905 may be performed by a sidelink configuration manager 1325 as described with reference to FIG. 13.

At 1910, the method may include determining a synchronization timing at the first device node based on a local clock at the first device node that is configured for sidelink communications. The operations of 1910 may be performed in accordance with examples as disclosed herein. In some examples, aspects of the operations of 1910 may be performed by a sidelink synchronization component 1340 as described with reference to FIG. 13.

At 1915, the method may include identifying data to transmit from the first device node to a second device node of the set of multiple nodes. The operations of 1915 may be performed in accordance with examples as disclosed herein. In some examples, aspects of the operations of 1915 may be performed by an TSN packet manager 1330 as described with reference to FIG. 13.

At 1920, the method may include communicating with the second device node via a sidelink connection associated with the wireless radio access network. The operations of 1920 may be performed in accordance with examples as disclosed herein. In some examples, aspects of the operations of 1920 may be performed by a sidelink communications manager 1335 as described with reference to FIG. 13.

Figure 20:
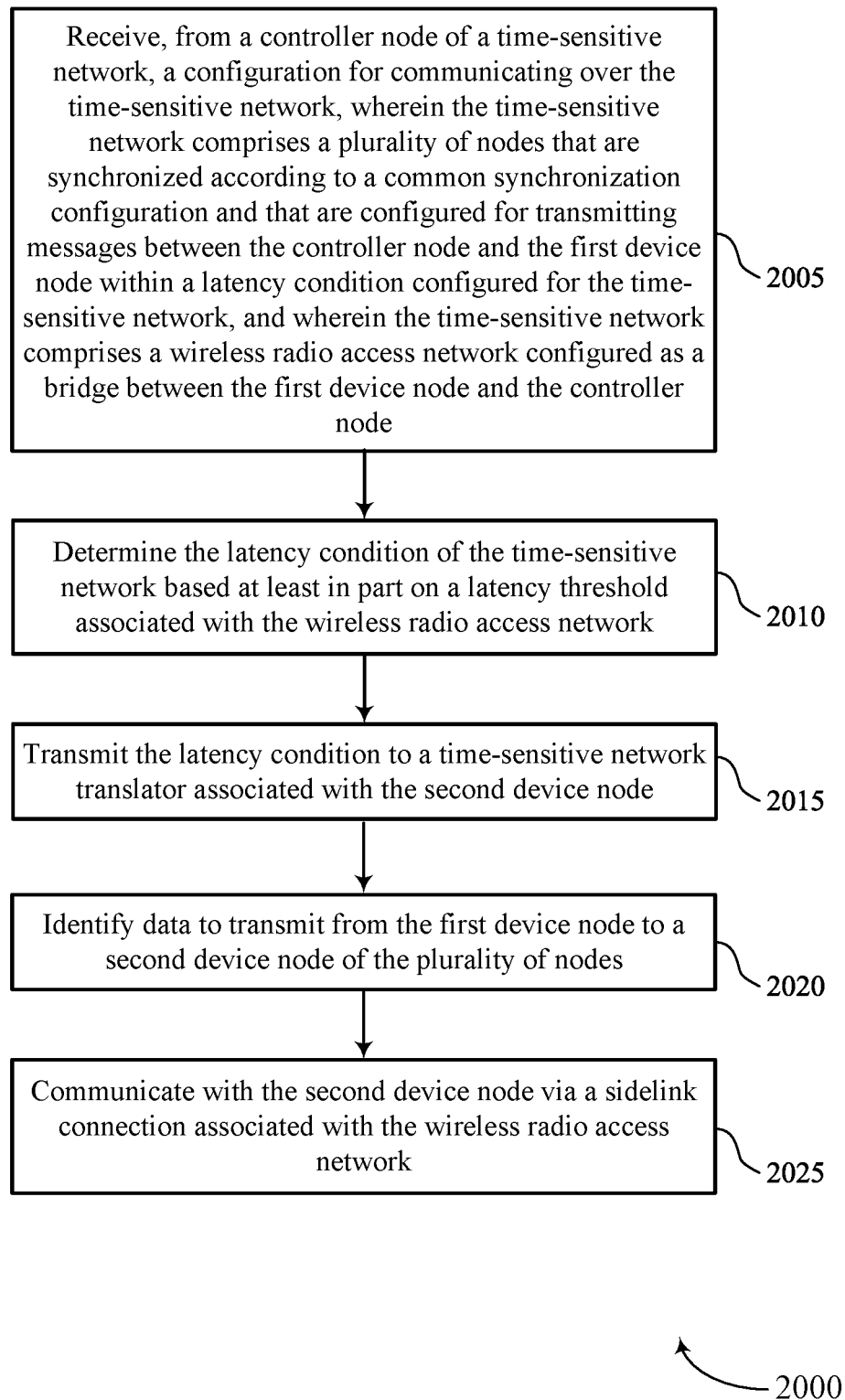

FIG. 20 shows a flowchart illustrating a method 2000 that supports TSN support over sidelink in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 2005 may be performed in accordance with examples as disclosed herein. In some examples, aspects of the operations of 2005 may be performed by a sidelink configuration manager 1325 as described with reference to FIG. 13.

At 2010, the method may include determining the latency condition of the time-sensitive network based on a latency threshold associated with the wireless radio access network. The operations of 2010 may be performed in accordance with examples as disclosed herein. In some examples, aspects of the operations of 2010 may be performed by a sidelink latency component 1345 as described with reference to FIG. 13.

At 2015, the method may include transmitting the latency condition to a time-sensitive network translator associated with the second device node. The operations of 2015 may be performed in accordance with examples as disclosed herein. In some examples, aspects of the operations of 2015 may be performed by a sidelink latency component 1345 as described with reference to FIG. 13.

At 2020, the method may include identifying data to transmit from the first device node to a second device node of the set of multiple nodes. The operations of 2020 may be performed in accordance with examples as disclosed herein.

In some examples, aspects of the operations of 2020 may be performed by an TSN packet manager 1330 as described with reference to FIG. 13.

At 2025, the method may include communicating with the second device node via a sidelink connection associated with the wireless radio access network. The operations of 2025 may be performed in accordance with examples as disclosed herein. In some examples, aspects of the operations of 2025 may be performed by a sidelink communications manager 1335 as described with reference to FIG. 13.

Figure 21:
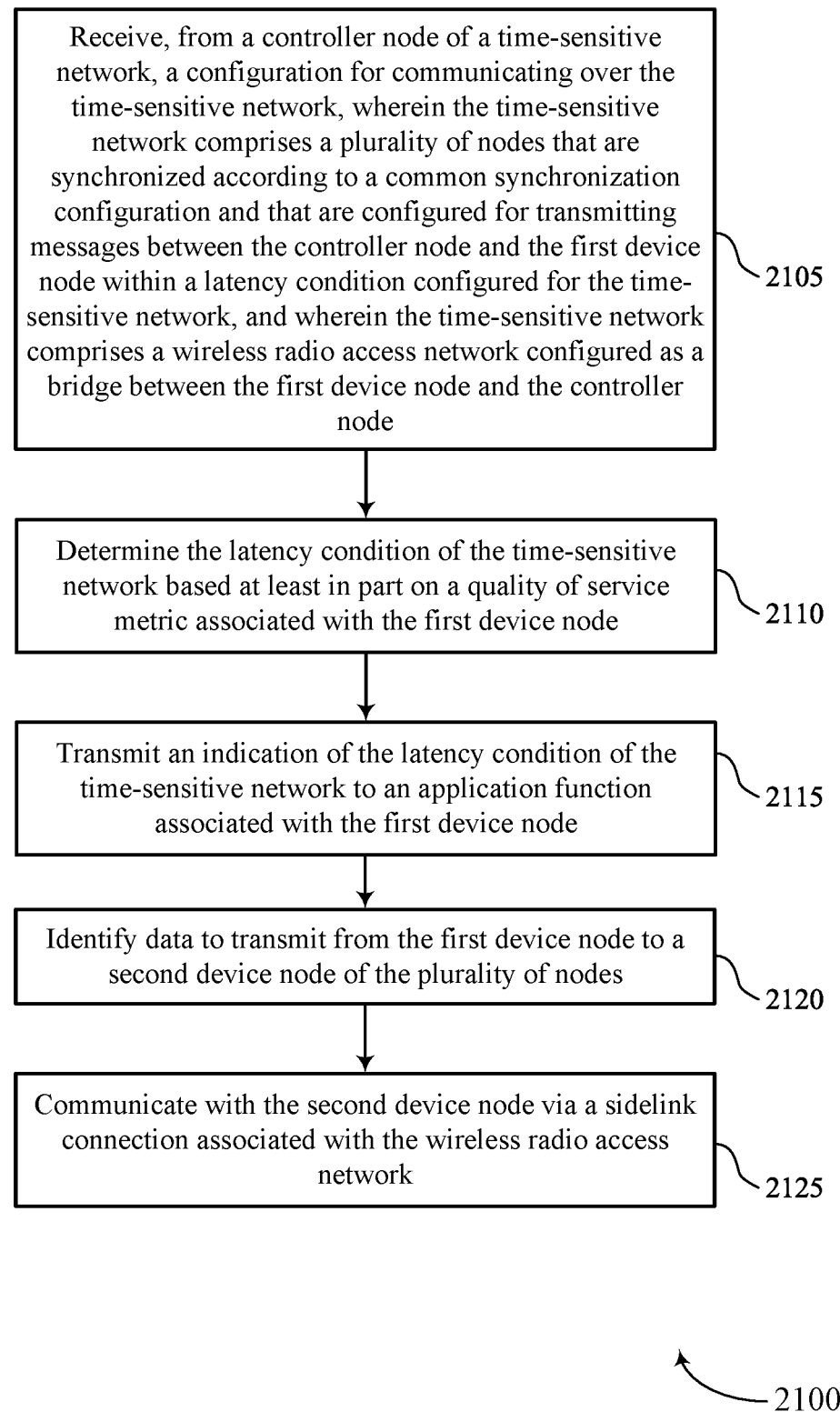

FIG. 21 shows a flowchart illustrating a method 2100 that supports TSN support over sidelink in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a controller node of a time-sensitive network, a configuration for communicating over the time-sensitive network, where the time-sensitive network includes a set of multiple nodes that are synchronized according to a common synchronization configuration and that are configured for transmitting messages between the controller node and the first device node within a latency condition configured for the time-sensitive network, and where the time-sensitive network includes a wireless radio access network configured as a bridge between the first device node and the controller node. The operations of 2105 may be performed in accordance with examples as disclosed herein. In some examples, aspects of the operations of 2105 may be performed by a sidelink configuration manager 1325 as described with reference to FIG. 13.

At 2110, the method may include determining the latency condition of the time-sensitive network based on a quality of service metric associated with the first device node. The operations of 2110 may be performed in accordance with examples as disclosed herein. In some examples, aspects of the operations of 2110 may be performed by a sidelink latency component 1345 as described with reference to FIG. 13.

At 2115, the method may include transmitting an indication of the latency condition of the time-sensitive network to an application function associated with the first device node. The operations of 2115 may be performed in accordance with examples as disclosed herein. In some examples, aspects of the operations of 2115 may be performed by a sidelink latency component 1345 as described with reference to FIG. 13.

At 2120, the method may include identifying data to transmit from the first device node to a second device node of the set of multiple nodes. The operations of 2120 may be performed in accordance with examples as disclosed herein. In some examples, aspects of the operations of 2120 may be performed by an TSN packet manager 1330 as described with reference to FIG. 13.

At 2125, the method may include communicating with the second device node via a sidelink connection associated with the wireless radio access network. The operations of 2125 may be performed in accordance with examples as disclosed herein. In some examples, aspects of the operations of 2125 may be performed by a sidelink communications manager 1335 as described with reference to FIG. 13.

The following provides an overview of aspects of the present disclosure:

Aspect 1: A method of wireless communication at a first device node, comprising: receiving, from a controller node of a time-sensitive network, a configuration for communicating over the time-sensitive network, wherein the time-sensitive network comprises a plurality of nodes that are synchronized according to a common synchronization configuration and that are configured for transmitting messages between the controller node and the first device node within a latency condition configured for the time-sensitive network, and wherein the time-sensitive network comprises a wireless radio access network configured as a bridge between the first device node and the controller node; identifying data to transmit from the first device node to a second device node of the plurality of nodes; and communicating with the second device node via a sidelink connection associated with the wireless radio access network.

Aspect 2: The method of aspect 1, wherein the sidelink connection is configured as a link within the bridge associated with the wireless radio access network.

Aspect 3: The method of aspect 2, wherein communicating with the second device node via the sidelink connection comprises: transmitting the data to a management layer within the bridge associated with the wireless radio access network.

Aspect 4: The method of aspect 3, wherein the sidelink connection is associated with a single user plane function identifier.

Aspect 5: The method of aspect 4, wherein the management layer is configured to interface between one or more components of the sidelink connection and one or more components associated with the first device node.

Aspect 6: The method of any of aspects 1 through 5, wherein the sidelink connection is configured as an exposed link of the time-sensitive network.

Aspect 7: The method of aspect 6, wherein the sidelink connection is associated with a device-side time-sensitive network translator of the time-sensitive network, and the device-side time-sensitive network translator is exposed to the first device node Aspect 8: The method of aspect 7, wherein communicating with the second device node via the sidelink connection comprises: transmitting the data to the device-side time-sensitive network translator of the time-sensitive network.

Aspect 9: The method of any of aspects 7 through 8, wherein the wireless radio access network is associated with a second dedicate time-sensitive network translator separate from the device-side time-sensitive network translator associated with the sidelink connection.

Aspect 10: The method of any of aspects 1 through 9, further comprising: determining a synchronization timing at the first device node based at least in part on a synchronization clock associated with the wireless radio access network.

Aspect 11: The method of aspect 10, further comprising: transmitting, to the second device node, a sidelink synchronization frame comprising an indication of the synchronization timing.

Aspect 12: The method of aspect 11, wherein a time-sensitive network translator is configured to modify the indication of the synchronization timing based at least in part on the synchronization clock associated with the wireless radio access network.

Aspect 13: The method of any of aspects 1 through 12, further comprising: determining a synchronization timing at the first device node based at least in part on a local clock at the first device node that is configured for sidelink communications.

Aspect 14: The method of aspect 13, further comprising: transmitting, to the second device node, a timestamped synchronization message; and receiving a response to the timestamped synchronization message, wherein determining the synchronization timing is based at least in part on receiving the response.

Aspect 15: The method of aspect 14, further comprising: transmitting the determined synchronization timing to a time-sensitive network translator associated with the second device node.

Aspect 16: The method of any of aspects 13 through 15, wherein the local clock at the first device node is a copy of a synchronization clock associated with the wireless radio access network.

Aspect 17: The method of any of aspects 1 through 16, further comprising: determining the latency condition of the time-sensitive network based at least in part on a latency threshold associated with the wireless radio access network; and transmitting the latency condition to a time-sensitive network translator associated with the second device node.

Aspect 18: The method of aspect 17, wherein determining the latency condition comprises: determining a latency threshold associated with sidelink communications based at least in part on a delay associated with sidelink communications; and combining the latency threshold associated with the wireless radio access network with the latency threshold associated with sidelink communications.

Aspect 19: The method of aspect 18, wherein transmitting the latency condition comprises: transmitting the combination of the latency threshold associated with the wireless radio access network and the latency threshold associated with sidelink communications to the time-sensitive network translator.

Aspect 20: The method of any of aspects 1 through 19, further comprising: transmitting an indication of the latency condition of the time-sensitive network to an application function associated with the first device node.

Aspect 21: The method of aspect 20, further comprising: determining the latency condition of the time-sensitive network based at least in part on a quality of service metric associated with the first device node.

Aspect 22: An apparatus comprising a processor; memory coupled with the processor; and instructions stored in the memory and executable by the processor to cause the apparatus to perform a method of any of aspects 1 through 21.

Aspect 23: An apparatus comprising at least one means for performing a method of any of aspects 1 through 21.

Aspect 24: A non-transitory computer-readable medium storing code the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a first device node, comprising:
   receiving, from a controller node of a time-sensitive network, a configuration of a communication bridge between the first device node and the controller node for communicating over the time-sensitive network, wherein the time-sensitive network comprises a plurality of nodes that are synchronized according to a common synchronization configuration and that are configured for transmitting messages between the controller node and the first device node within a latency condition configured for the time-sensitive network, and wherein the time-sensitive network comprises a wireless radio access network configured, according to the configuration, as the communication bridge between the first device node and the controller node, the communication bridge comprising a plurality of translators for translating between time sensitive network communications and wireless access network communications;
   identifying data to transmit from the first device node to a second device node of the plurality of nodes; and
   communicating with the second device node via a sidelink connection associated with the wireless radio access network.

2. The method of claim 1, wherein the sidelink connection is configured as a link within the communication bridge associated with the wireless radio access network.

3. The method of claim 2, wherein communicating with the second device node via the sidelink connection comprises:
   transmitting the data to a management layer within the communication bridge associated with the wireless radio access network.

4. The method of claim 3, wherein the sidelink connection is associated with a single user plane function identifier.

5. The method of claim 4, wherein the management layer is configured to interface between one or more components of the sidelink connection and one or more components associated with the first device node.

6. The method of claim 1, wherein the sidelink connection is configured as an exposed link of the time-sensitive network.

7. The method of claim 6, wherein:
   the sidelink connection is associated with a device-side time-sensitive network translator of the time-sensitive network, and
   the device-side time-sensitive network translator is exposed to the first device node.

8. The method of claim 7, wherein communicating with the second device node via the sidelink connection comprises:
   transmitting the data to the device-side time-sensitive network translator of the time-sensitive network.

9. The method of claim 7, wherein the wireless radio access network is associated with a second time-sensitive network translator dedicated to the wireless radio access network, the second time-sensitive network translator separate from the device-side time-sensitive network translator associated with the sidelink connection.

10. The method of claim 1, further comprising:
    determining a synchronization timing at the first device node based at least in part on a synchronization clock associated with the wireless radio access network.

11. The method of claim 10, further comprising:
    transmitting, to the second device node, a sidelink synchronization frame comprising an indication of the synchronization timing.

12. The method of claim 11, wherein a time-sensitive network translator is configured to modify the indication of the synchronization timing based at least in part on the synchronization clock associated with the wireless radio access network.

13. The method of claim 1, further comprising:
determining a synchronization timing at the first device node based at least in part on a local clock at the first device node that is configured for sidelink communications.

14. The method of claim 13, further comprising:
transmitting, to the second device node, a timestamped synchronization message; and
receiving a response to the timestamped synchronization message, wherein determining the synchronization timing is based at least in part on receiving the response.

15. The method of claim 14, further comprising:
transmitting the determined synchronization timing to a time-sensitive network translator associated with the second device node.

16. The method of claim 13, wherein the local clock at the first device node is a copy of a synchronization clock associated with the wireless radio access network.

17. The method of claim 1, further comprising:
determining the latency condition of the time-sensitive network based at least in part on a latency threshold associated with the wireless radio access network; and
transmitting the latency condition to a time-sensitive network translator associated with the second device node.

18. The method of claim 17, wherein determining the latency condition comprises:
determining a latency threshold associated with sidelink communications based at least in part on a delay associated with the sidelink communications; and
combining the latency threshold associated with the wireless radio access network with the latency threshold associated with the sidelink communications.

19. The method of claim 18, wherein transmitting the latency condition comprises:
transmitting a combination of the latency threshold associated with the wireless radio access network and the latency threshold associated with the sidelink communications to the time-sensitive network translator.

20. The method of claim 1, further comprising:
determining the latency condition of the time-sensitive network based at least in part on a quality of service metric associated with the first device node.

21. The method of claim 20, further comprising:
transmitting an indication of the latency condition of the time-sensitive network to an application function associated with the first device node.

22. An apparatus at a first device node, comprising:
a processor;
memory coupled with the processor; and
instructions stored in the memory and executable by the processor to cause the apparatus to:
receive, from a controller node of a time-sensitive network, a configuration of a communication bridge between the first device node and the controller node for communicating over the time-sensitive network, wherein the time-sensitive network comprises a plurality of nodes that are synchronized according to a common synchronization configuration and that are configured for transmitting messages between the controller node and the first device node within a latency condition configured for the time-sensitive network, and wherein the time-sensitive network comprises a wireless radio access network config-ured, according to the configuration, as the communication bridge between the first device node and the controller node, the communication bridge comprising a plurality of translators for translating between time sensitive network communications and wireless access network communications;
identify data to transmit from the first device node to a second device node of the plurality of nodes; and
communicate with the second device node via a sidelink connection associated with the wireless radio access network.

23. The apparatus of claim 22, wherein the sidelink connection is configured as a link within the communication bridge associated with the wireless radio access network.

24. The apparatus of claim 22, wherein the sidelink connection is configured as an exposed link of the time-sensitive network.

25. The apparatus of claim 22, wherein the instructions are further executable by the processor to cause the apparatus to:
determine a synchronization timing at the first device node based at least in part on a synchronization clock associated with the wireless radio access network.

26. The apparatus of claim 22, wherein the instructions are further executable by the processor to cause the apparatus to:
determine a synchronization timing at the first device node based at least in part on a local clock at the first device node that is configured for sidelink communications.

27. The apparatus of claim 22, wherein the instructions are further executable by the processor to cause the apparatus to:
determine the latency condition of the time-sensitive network based at least in part on a latency threshold associated with the wireless radio access network; and
transmit the latency condition to a time-sensitive network translator associated with the second device node.

28. The apparatus of claim 22, wherein the instructions are further executable by the processor to cause the apparatus to:
determine the latency condition of the time-sensitive network based at least in part on a quality of service metric associated with the first device node.

29. An apparatus at a first device node, comprising:
means for receiving, from a controller node of a time-sensitive network, a configuration of a communication bridge between the first device node and the controller node for communicating over the time-sensitive network, wherein the time-sensitive network comprises a plurality of nodes that are synchronized according to a common synchronization configuration and that are configured for transmitting messages between the controller node and the first device node within a latency condition configured for the time-sensitive network, and wherein the time-sensitive network comprises a wireless radio access network configured, according to the configuration, as the communication bridge between the first device node and the controller node, the communication bridge comprising a plurality of translators for translating between time sensitive network communications and wireless access network communications;
means for identifying data to transmit from the first device node to a second device node of the plurality of nodes; and means for communicating with the second device node via a sidelink connection associated with the wireless radio access network.

30. A non-transitory computer-readable medium storing code, the code comprising instructions executable by a processor to:

receive, from a controller node of a time-sensitive network, a configuration of a communication bridge between a first device node and the controller node for communicating over the time-sensitive network, wherein the time-sensitive network comprises a plurality of nodes that are synchronized according to a common synchronization configuration and that are configured for transmitting messages between the controller node and the first device node within a latency condition configured for the time-sensitive network, and wherein the time-sensitive network comprises a wireless radio access network configured, according to the configuration, as the communication bridge between the first device node and the controller node, the communication bridge comprising a plurality of translators for translating between time sensitive network communications and wireless access network communications;

identify data to transmit from the first device node to a second device node of the plurality of nodes; and communicate with the second device node via a sidelink connection associated with the wireless radio access network.

* * * * *